US008421005B2

(12) United States Patent
Musselman

(10) Patent No.: US 8,421,005 B2
(45) Date of Patent: Apr. 16, 2013

(54) SYSTEMS AND METHODS FOR TRANSFER OF IONS FOR ANALYSIS

(75) Inventor: Brian D. Musselman, Melrose, MA (US)

(73) Assignee: Ionsense, Inc., Saugus, MA (US)

(*) Notice: Subject to any disclaimer, the term of this patent is extended or adjusted under 35 U.S.C. 154(b) by 368 days.

(21) Appl. No.: 12/709,157

(22) Filed: Feb. 19, 2010

(65) Prior Publication Data

US 2010/0140468 A1 Jun. 10, 2010

Related U.S. Application Data

(63) Continuation of application No. 11/754,158, filed on May 25, 2007, now Pat. No. 7,714,281, and a continuation of application No. 11/754,189, filed on May 25, 2007, now Pat. No. 7,705, 297.

(60) Provisional application No. 60/808,609, filed on May 26, 2006.

(51) Int. Cl.
*B01D 59/44* (2006.01)
*H01J 49/00* (2006.01)

(52) U.S. Cl.
USPC ........... 250/281; 250/282; 250/286; 250/287; 250/288; 250/292; 250/294; 250/295; 250/396 R; 250/423 R; 250/424

(58) Field of Classification Search .......... 250/286–288, 250/281, 282, 292, 294, 295, 396 R, 423 R, 250/424
See application file for complete search history.

(56) References Cited

U.S. PATENT DOCUMENTS 3,633,027 A 1/1972 Ryhage
3,957,470 A 5/1976 Dawes
(Continued)

FOREIGN PATENT DOCUMENTS

GB 2263578 7/1993
WO WO03025973 3/2003
(Continued)

OTHER PUBLICATIONS

Barber, M. et al., "Fast atom bombardment of solids (F.A.B.): a new ion source for mass spectrometry" J.Chem. Soc. Chem. Commun., 1981, 325.

(Continued)

*Primary Examiner* — Jack Berman
*Assistant Examiner* — Meenakshi Sahu
(74) *Attorney, Agent, or Firm* — Sci-Law Strategies, PC

(57) ABSTRACT

The present invention is a device to restrict the sampling of analyte ions and neutral molecules from surfaces with mass spectrometry and thereby sample from a defined area or volume. In various embodiments of the present invention, a tube is used to sample ions formed with a defined spatial resolution from desorption ionization at or near atmospheric pressures. In an embodiment of the present invention, electrostatic fields are used to direct ions to either individual tubes or a plurality of tubes positioned in close proximity to the surface of the sample being analyzed. In an embodiment of the present invention, wide diameter sampling tubes can be used in combination with a vacuum inlet to draw ions and neutrals into the spectrometer for analysis. In an embodiment of the present invention, wide diameter sampling tubes in combination with electrostatic fields improve the efficiency of ion collection.

20 Claims, 21 Drawing Sheets

U.S. PATENT DOCUMENTS

| | | | |
|---|---|---|---|
| 4,016,421 A | 4/1977 | Hull | |
| 4,213,326 A | 7/1980 | Brodasky | |
| 4,542,293 A | 9/1985 | Fenn | |
| 4,546,253 A | 10/1985 | Tsuchiya | |
| 4,654,052 A | 3/1987 | Sharp | |
| 4,861,988 A | 8/1989 | Henion | |
| 5,012,052 A | 4/1991 | Hayes | |
| 5,055,677 A | 10/1991 | Amirav | |
| 5,137,553 A | 8/1992 | Dawes | |
| 5,192,865 A | 3/1993 | Zhu | |
| 5,306,412 A | 4/1994 | Whitehouse | |
| 5,352,892 A | 10/1994 | Mordehai | |
| 5,367,163 A | 11/1994 | Otsuka | |
| 5,381,008 A | 1/1995 | Tanner | |
| 5,412,208 A | 5/1995 | Covey | |
| 5,448,062 A | 9/1995 | Cooks | |
| 5,552,599 A | 9/1996 | Giessmann | |
| 5,559,326 A | 9/1996 | Goodley | |
| 5,614,711 A | 3/1997 | Li | |
| 5,624,537 A | 4/1997 | Turner | |
| 5,684,300 A | 11/1997 | Taylor | |
| 5,736,741 A | 4/1998 | Bertsch | |
| 5,788,166 A | 8/1998 | Valaskovic | |
| 5,868,322 A | 2/1999 | Loucks, Jr. | |
| 5,959,297 A | 9/1999 | Weinberg | |
| 5,997,746 A | 12/1999 | Valaskovic | |
| 6,107,628 A | 8/2000 | Smith | |
| 6,124,675 A | 9/2000 | Bertran | |
| 6,190,559 B1 | 2/2001 | Valaskovic | |
| 6,225,623 B1 | 5/2001 | Turner | |
| 6,359,275 B1 | 3/2002 | Bertsch | |
| 6,395,183 B1 | 5/2002 | Valaskovic | |
| 6,562,211 B1 | 5/2003 | Kunnecke | |
| 6,583,408 B2 | 6/2003 | Smith | |
| 6,600,155 B1 | 7/2003 | Andrien, Jr. | |
| 6,646,256 B2 | 11/2003 | Gourley | |
| 6,649,907 B2 | 11/2003 | Ebeling | |
| 6,670,608 B1 | 12/2003 | Taylor | |
| 6,690,006 B2 | 2/2004 | Valaskovic | |
| 6,717,139 B2 | 4/2004 | Taniguchi | |
| 6,723,985 B2 | 4/2004 | Schultz | |
| 6,744,041 B2 | 6/2004 | Sheehan | |
| 6,744,046 B2 | 6/2004 | Valaskovic | |
| 6,784,424 B1 | 8/2004 | Willoughby | |
| 6,803,565 B2 | 10/2004 | Smith | |
| 6,806,468 B2 | 10/2004 | Laiko | |
| 6,818,889 B1 | 11/2004 | Sheehan | |
| 6,861,647 B2 | 3/2005 | Reilly | |
| 6,878,930 B1 | 4/2005 | Willoughby | |
| 6,888,132 B1 | 5/2005 | Sheehan | |
| 6,914,243 B2 | 7/2005 | Sheehan | |
| 6,943,347 B1 | 9/2005 | Willoughby | |
| 6,949,739 B2 | 9/2005 | Franzen | |
| 6,949,740 B1 | 9/2005 | Sheehan | |
| 6,949,741 B2 | 9/2005 | Cody | |
| 6,956,205 B2 | 10/2005 | Park | |
| 6,977,372 B2 | 12/2005 | Valaskovic | |
| 6,979,816 B2 | 12/2005 | Tang | |
| 6,992,299 B2 | 1/2006 | Lee | |
| 7,015,466 B2 | 3/2006 | Takats | |
| 7,064,317 B2 | 6/2006 | McCluckey | |
| 7,081,618 B2 | 7/2006 | Laprade | |
| 7,081,621 B1 | 7/2006 | Willoughby | |
| 7,095,019 B1 | 8/2006 | Sheehan | |
| 7,112,785 B2 | 9/2006 | Laramee | |
| 7,138,626 B1 | 11/2006 | Karpetsky | |
| 7,161,145 B2 | 1/2007 | Oser | |
| 7,196,525 B2 | 3/2007 | Sparkman | |
| 7,253,406 B1 | 8/2007 | Sheehan | |
| 7,423,261 B2 | 9/2008 | Truche et al. | |
| 7,429,731 B1 | 9/2008 | Karpetsky | |
| 7,544,933 B2 | 6/2009 | Cooks | |
| 7,569,812 B1 | 8/2009 | Karpetsky | |
| 7,700,913 B2 | 4/2010 | Musselman | |
| 7,705,297 B2 | 4/2010 | Musselman | |
| 7,714,281 B2 | 5/2010 | Musselman | |
| 7,777,181 B2 | 8/2010 | Musselman | |
| 7,893,408 B2 | 2/2011 | Hieftje | |
| 7,928,364 B2 | 4/2011 | Musselman | |
| 7,929,138 B1 | 4/2011 | Webb | |
| 8,026,477 B2 | 9/2011 | Musselman | |
| 2002/0005478 A1 | 1/2002 | Hillenkamp | |
| 2002/0121596 A1 | 9/2002 | Laiko | |
| 2002/0185593 A1 | 12/2002 | Doring | |
| 2002/0185595 A1 | 12/2002 | Smith | |
| 2002/0185606 A1 | 12/2002 | Smith | |
| 2003/0052268 A1 | 3/2003 | Doroshenko | |
| 2004/0094706 A1 | 5/2004 | Covey | |
| 2004/0129876 A1 | 7/2004 | Franzen | |
| 2004/0159784 A1 | 8/2004 | Doroshenko | |
| 2004/0169137 A1 | 9/2004 | Westphall | |
| 2005/0079631 A1 | 4/2005 | Laiko | |
| 2005/0230635 A1* | 10/2005 | Takats et al. | 250/424 |
| 2005/0236374 A1 | 10/2005 | Blankenship | |
| 2005/0236565 A1 | 10/2005 | Oser | |
| 2006/0071665 A1 | 4/2006 | Blake | |
| 2006/0079002 A1 | 4/2006 | Gologan | |
| 2006/0097157 A1 | 5/2006 | Ouyang | |
| 2006/0163468 A1 | 7/2006 | Wells | |
| 2006/0249671 A1 | 11/2006 | Karpetsky | |
| 2006/0250138 A1* | 11/2006 | Sparkman et al. | 324/464 |
| 2006/0266941 A1 | 11/2006 | Vestal | |
| 2007/0114389 A1 | 5/2007 | Karpetsky | |
| 2007/0187589 A1 | 8/2007 | Cooks | |
| 2007/0278397 A1 | 12/2007 | Bateman | |
| 2008/0073548 A1 | 3/2008 | Denton | |
| 2008/0156985 A1 | 7/2008 | Venter | |
| 2008/0202915 A1 | 8/2008 | Hieftje | |
| 2009/0272893 A1 | 11/2009 | Hieftje | |
| 2010/0078550 A1 | 4/2010 | Wiseman | |
| 2010/0102222 A1 | 4/2010 | Musselman | |
| 2010/0140468 A1 | 6/2010 | Musselman | |
| 2010/0294925 A1 | 11/2010 | Musselman | |
| 2011/0042560 A1 | 2/2011 | Ouyang | |
| 2011/0101216 A1 | 5/2011 | Musselman | |
| 2011/0240844 A1* | 10/2011 | Ouyang et al. | 250/282 |

FOREIGN PATENT DOCUMENTS

| | | |
|---|---|---|
| WO | WO03081205 | 10/2003 |
| WO | WO2004068131 | 8/2004 |
| WO | WO2005094389 | 10/2005 |
| WO | WO2007/103693 | 9/2007 |
| WO | WO2007/140349 | 12/2007 |
| WO | WO2007/140351 | 12/2007 |
| WO | WO2008/046111 | 4/2008 |
| WO | WO2008/054393 | 5/2008 |
| WO | WO2008/082603 | 7/2008 |
| WO | WO2009/023361 | 2/2009 |
| WO | WO2011/072130 | 6/2011 |
| WO | WO2011/106656 | 9/2011 |

OTHER PUBLICATIONS

Cody, R.B. et al., "Versatile New Ion Source for the Analysis of Materials in Open Air under Ambient Conditions" Anal. Chem., 2005, 77, 2297-2302.

Cooks, R.G. et al., "Ambient Mass Spectrometry", Science, 2006, 311, 1566-1570.

Dalton, C.N. et al., "Electrospray-Atmospheric Sampling Glow Discharge Ionization Source for the Direct Analysis of Liquid Samples", Analytical Chemistry, Apr. 1, 2003, vol. 75, No. 7, pp. 1620-1627.

Fenn et al., "Electrospray Ionization for Mass Spectrometry of Large Biomolecules," Science, vol. 246, No. 4926, Oct. 6, 1989, pp. 64-71.

Guzowski, J.P. Jr. et al., "Development of a Direct Current Gas Sampling Glow Discharge Ionization Source for the Time-of-Flight Mass Spectrometer", J. Anal. At. Spectrom., 14, 1999, pp. 1121-1127.

Haddad, R., et at., "Easy Ambient Sonic-Spray Ionization Mass Spectrometry Combined with Thin-Layer Chromatography," *Analytical Chemistry*, vol. 80, No. 8, Apr. 15, 2008, pp. 2744-2750.

Hill, C.A. at al., "A pulsed corona discharge switchable high resolution ion mobility spectrometer-mass spectrometer", Analyst, 2003, 128, pp. 55-60.

Hiraoka, K. et al., "Atmospheric-Pressure Penning Ionization Mass Spectrometry", Rapid Commun. Mass Spectrom., 18, 2004, pp. 2323-2330.

Hites, Gas Chromatography Mass Spectrometry, Chapter 39, Jun. 24, 1997, pp. 609-626.
Karas, M. et al., "Laser desorption ionization of proteins with molecular masses exceeding 10,000 daltons" Anal. Chem. 1988, 60, 2299-2301.
Kojiro, D.R. et al., "Determination of C.sub.1-C.sub.4 Alkanes by Ion Mobility Spectrometry", Anal. Chem., 63, 1991, pp. 2295-2300.
Leymarie, N. et al., "Negative Ion Generation Using a MAB Source", Presented at the Annual Meeting of the American Society of Mass Spectrometry, 2000.
McLuckey, S.A. et al., "Atmospheric Sampling Glow Discharge Ionization Source for the Determination of Trace Organic Compounds in Ambient Air", Anal. Chem., 60, 1988, pp. 2220-2227.
Otsuka, K, et al., "An Interface for Liquid Chromatograph/Liquid Ionization Mass Spectrometer", Analytical Sciences. Oct. 1988. vol. 4, pp. 467-472.
Takáts et al., "Mass Spectrometry Sampling Under Ambient Conditions with Desorption Electrospray Ionization," Science, vol. 306, No. 5695, Oct. 15, 2004, pp. 471-473.
Tanaka, K. et al., "Protein and polymer analyses up to m/z 100,000 by laser ionization time-of-flight", Rapid Commun. Mass Spectrom., 1988, 2, 151-153.
Tembreull, R., et al., "Pulsed Laser Desorption with Resonant Two-Photon Ionization Detection in Supersonic Beam Mass Spectrometry," Anal. Chem., vol. 58, 1986, pp. 1299-1303, p. 1299.
Zhao, J. et al., Liquid Sample Injection Using an Atmospheric Pressure Direct Current Glow Discharge Ionization Source, Analytical Chemistry, Jul. 1, 1992, vol. 64, No. 13, pp. 1426-1433.
International Search Report for Int'l Application No. PCT/US07/63006, Jul. 1, 2010.
International Search Report for Int'l Application No. PCT/US07/69821, Mar. 25, 2010.
International Search Report for Int'l Application No. PCT/US07/69823, Aug. 4, 2010.
International Search Report for Int'l Application No. PCTIUS07/81439, Apr. 14, 2010.
Supplementary European Search Report dated Jan. 7, 2010 in Application No. 07757665.0 PCT/US2007/063006, 8 pages.
Supplementary European Search Report dated Mar. 10, 2010 in Application No. 07797812.0 PCT/US2007/069823, 9 pages.
Supplementary European Search Report dated Mar. 25, 2010 in Application No. 07797811.2 PCT/US2007/069821, 9 pages.
Supplementary European Search Report dated Mar. 10, 2010 in Application No. 07844307.4 PCT/US2007/081439, 12 pages.

* cited by examiner

SYSTEMS AND METHODS FOR TRANSFER OF IONS FOR ANALYSIS

PRIORITY CLAIM

This application is a continuation of U.S. patent application Ser. No: 11/754,158, entitled "APPARATUS FOR HOLDING SOLIDS FOR USE WITH SURFACE IONIZATION TECHNOLOGY" by Brian D. Musselman, filed May 25, 2007 which issued as U.S. Pat. No. 7,714,281, and U.S. patent application Ser. No: 11/754,189, entitled "FLEXIBLE OPEN TUBE SAMPLING SYSTEM FOR USE WITH SURFACE IONIZATION TECHNOLOGY" by Brian D. Musselman, filed May 25, 2007 which issued as U.S. Pat. No 7,705,297, each of which claim the benefit of priority under 35 U.S.C. §119(e) to United States Provisional Patent Application Ser. No: 60/808,609, entitled "HIGH RESOLUTION SAMPLING SYSTEM FOR USE WITH SURFACE IONIZATION TECHNOLOGY", by Brian D. Musselman, filed May 26, 2006, which applications are each herein expressly incorporated by reference in their entireties.

CROSS REFERENCE TO RELATED APPLICATIONS

This application is related to the following applications:

(1) U.S. patent application Ser. No: 11/754,115, entitled "HIGH RESOLUTION SAMPLING SYSTEM FOR USE WITH SURFACE IONIZATION TECHNOLOGY" by Brian D. Musselman, filed May 25, 2007 which issued as U.S. Pat. No 7,777,181; and (2) U.S. patent application Ser. No: 11/580,323, entitled "SAMPLING SYSTEM FOR USE WITH SURFACE IONIZATION SPECTROSCOPY" by Brian D. Musselman, filed Oct. 13, 2006 which issued as U.S. Pat. No 7,700,913.

These applications ((1)-(2)) are herein expressly incorporated by reference in their entireties.

FIELD OF THE INVENTION

The present invention is a device to direct the sampling of analyte ions and neutral molecules from analytes with mass spectrometry and thereby sample from a defined area or volume and sample a solid or liquid without the need for chemical preparative steps.

BACKGROUND OF THE INVENTION

A desorption ionization source allowing desorption and ionization of molecules from surfaces, ionization direct from liquids and ionization of molecules in vapor was recently developed by Cody et al. as described in "Atmospheric Pressure Ionization Source" U.S. Pat. No. 6,949,741 which is expressly incorporated by reference in its entirety. Cody et al. allows for the Direct Analysis in Real Time (DART®) of analyte samples. This method utilizes low mass atoms or molecules including Helium, Nitrogen and other gases that can be present as long lived metastables as a carrier gas. These carrier gas species are present in high abundance at atmospheric pressure where the ionization occurs. This ionization method offers a number of advantages for rapid analysis of analyte samples.

SUMMARY OF THE INVENTION

There remain encumbrances to the employment of the Cody DART® technique for a variety of samples and various experimental circumstances. Further, the development of these efficient desorption ionization sources for use with mass spectrometer systems has generated a need for increased accuracy in the determination of the site of desorption of molecules from samples. While the current sampling systems provide the means for selective ionization of molecules on surfaces those molecules are often present in thin films or part of the bulk of the material. In the case of crystalline powders, insoluble material and many chemical species that react with solvents, surface ionization is difficult due to the need for the molecules to be retained in the ionization area. While the current sampling systems provide the means for selective collection of ions from a spot on the surface they do so without necessarily excluding ions being desorbed from locations adjacent to the sample spot of interest. It can be advantageous to increase the spatial resolution for sampling surfaces without losing sensitivity. Improved resolution in spatial sampling can enable higher throughput analysis and potential for use of selective surface chemistry for isolating and localizing molecules for analysis. The capability to localize molecules, powders, and non-bulk materials for surface ionization is necessary for more widespread application of the technology in problem solving and routine analyses where the use of solvents is not practical. It can also be advantageous to sample analyte ions in the absence of background and without the need to make a solution to introduce the sample into a 'clean' ionization region. Further, it can be desirable to be able to direct the desorption ionization source at an analyte sample at a significant distance from the mass spectrometer.

In various embodiments of the present invention, a tube is used to sample ions formed with a defined spatial resolution from desorption ionization at or near atmospheric pressures. In an embodiment of the present invention, electrostatic fields are used to direct ions to either individual tubes or a plurality of tubes positioned in close proximity to the surface of the sample being analyzed. In an alternative embodiment of the present invention, wide diameter sampling tubes can be used in combination with a vacuum inlet to draw ions and neutrals into the spectrometer for analysis. In another embodiment of the present invention, wide diameter sampling tubes in combination with electrostatic fields improve the efficiency of ion collection. In an embodiment of the invention, wide diameter sampling tubes containing segments with different diameters improve the efficiency of ion collection. In various alternative embodiments of the invention, a permeable barrier is used to physically retain solid materials for surface desorption analysis while improving the efficiency of ion collection. In an embodiment of the invention, a permeable barrier is placed across the opening of either the normal atmospheric pressure inlet or the wide diameter sampling tube to enable analysis of analytes which have been in contact with the permeable barrier.

BRIEF DESCRIPTION OF THE DRAWINGS

This invention is described with respect to specific embodiments thereof. Additional aspects can be appreciated from the Figures in which.

DETAILED DESCRIPTION OF THE INVENTION

Figure 1:
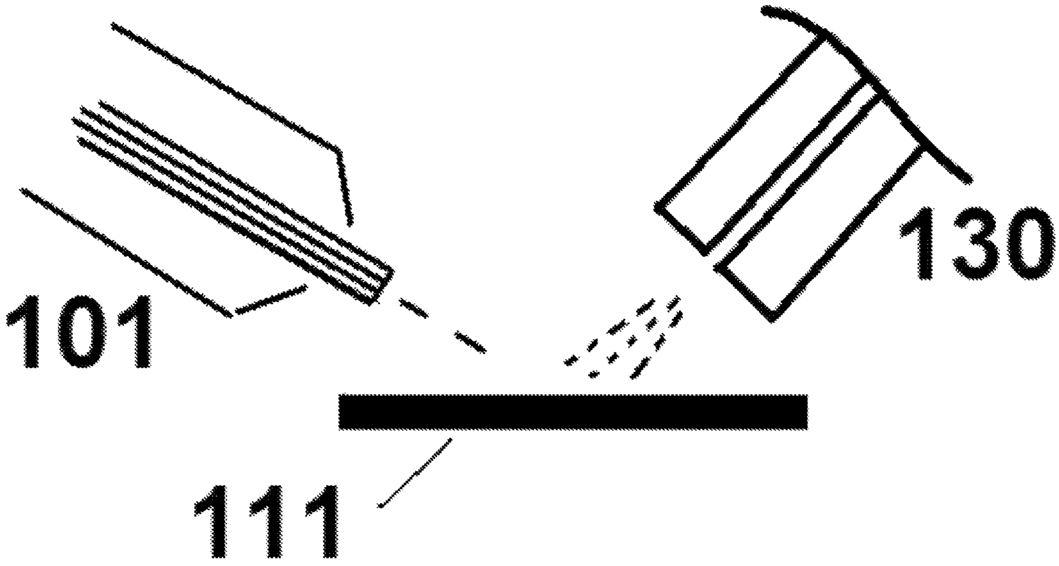
FIG. 1 is a diagram of an ion sampling device that provides for collection of ions and transmission of ions from their site of generation to the spectrometer system inlet.

Direct Ionization in Real Time (DART®) (Cody, R. B., Laramee, J. A., Durst, H. D.), "Versatile New Ion Source for the Analysis of Materials in Open Air under Ambient Conditions," *Anal. Chem.,* 2005, 77, 2297-2302, and Desorption Electrospray Surface Ionization (DESI) (Cooks, R. G., Ouyang, Z., Takats, Z., Wiseman, J. M.), "Ambient Mass Spectrometry," *Science,* 2006, 311, 1566-1570, which are each explicitly incorporated by reference in their entireties, are two recent developments for efficient desorption ionization sources with mass spectrometer systems. DART® and DESI offer a number of advantages for rapid real time analysis of analyte samples. However, there remain encumbrances to the employment of these techniques for a variety of samples and various experimental circumstances. For example, it can be advantageous to increase the spatial resolution for sampling surfaces without losing sensitivity. Improved resolution in spatial sampling can enable higher throughput analysis and potential for use of selective surface chemistry for isolating and localizing molecules for analysis. Thus, there is a need for increased accuracy in the determination of the site of desorption of molecules from samples with DART® and DESI. Development of devices that enable reliable and reproducible positioning of powder samples, crystalline compounds and high temperature insoluble materials are also required.

Previous investigators have completed studies involving the use of desorption ionization methods such as Matrix Assisted Laser Desorption Ionization (MALDI) (Tanaka, K., Waki, H., Ido, Y., Akita, S., and Yoshida, Y.), "Protein and Polymer Analyses up to m/z 100,000 by Laser Ionization Time-of-Flight Mass Spectrometry," Rapid Commun. Mass Spectrom. 1988, 2, 151-153; Karas, M., Hillenkamp, F., "Laser Desorption Ionization of Proteins with Molecular Masses Exceeding 10,000 Daltons," *Anal. Chem.* 1988, 60, 2299-2301, which are each explicitly incorporated by reference in their entireties. The desorption of selected biomolecules with reliable determination of the site of desorption has been reported for MALDI and other ionization systems such as secondary ion desorption (SIMS) and fast atom bombardment (Barber, M., Bordoli, R. S., Elliot, G. J., Sedgwick, R. D., Tyler, A. N.), "Fast Atom Bombardment of Solids (F.A.B.): A New Ion Source for Mass Spectrometry," *J. Chem. Soc. Chem. Commun.,* 1981, 325-327, which is explicitly incorporated by reference in its entirety. These experiments have been completed by using samples under high vacuum desorption conditions inside of the mass spectrometer. Reports regarding the use of Atmospheric Pressure MALDI (AP-MALDI), DART® and DESI have also been published although in all cases reported, the sampling system used has been a simple capillary tube or sub-300 micron sized inlet with little or no modification of that inlet to provide for accurate sampling of the site of desorption.

In other experiments, investigators report the use of chemical modification of the surface of the MALDI target to create receptors for selection of specific types of chemical classes of molecules for subsequent desorption. In these systems the separation of the different analyte types from one another is being completed by the action of chemical and biochemical entities bound to the surface. The original location of the molecule of interest on the sample surface or its local environ is not normally retained with these systems. Sophisticated assays that incorporate the use of surface bound antibodies to selectively retain specific proteins and protein-conjugates derived from serum, blood and other biological fluids provide the means for isolating these molecules of interest on a surface for analysis by spectroscopic methods. The use of short to moderate length oligonucleotides immobilized on surfaces to bind specific complimentary strands of nucleotides derived from DNA, and RNA has also been demonstrated to provide the means for isolating molecules of interest on surfaces. While these systems can be used for concentrating the analyte they often lack information regarding the spatial position of the molecule to which the analyte is binding. It would be attractive to have a means of rapidly analyzing that analyte without disrupting the assay surface.

In the case of MALDI with the sample under high vacuum it is possible to effectively ionize samples from a very small, well-defined spot that has dimensions defined by the beam of light from the source and optics used to focus the radiation on the target. The lower limit of spot diameter ranges between 30 to 50 microns for Nitrogen-based lasers based on the optics employed to focus the 337 nm light source used in the majority of MALDI-TOF instruments. Although designs and lasers vary, it is difficult to ionize a sufficiently large enough number of ions needed to provide a detectable signal after mass separation once one reduces the ionizing laser beam diameter below 30 microns. The implication here is that with current technology it is difficult to spatially resolve components of a surface that are not spaced at a distance greater than 100 micron in the typical MALDI-TOF and 50 micron in instruments designed with high resolution ionization capability in mind. More recently the DART® ionization technique has been used to complete desorption of ions from surfaces at ground potential or samples to which little or no potential is applied to the surface. DART® technology involves the use of metastable atoms or molecules to efficiently ionize samples. In addition, surface ionization by using electrospray as proposed in DESI enable desorption of stable ions from surfaces. Fundamentally these technologies offer investigators the capability to ionize materials in a manner that allows for direct desorption of molecules of interest from the surface to which they are bound selectively. Indeed, published reports have shown such results along with claims of enabling reasonable spatial resolution for molecules on surfaces including leaves, biological tissues, flower petals, and thin layer chromatography plates. Both DESI and DART® can ionize molecules present in a very small spot with good efficiency, however the spot size from which desorption occurs is large compared with MALDI. Normal area of sampling in the DART® experiment is approximately 4 $mm^2$ in diameter, which is over 1000 times greater than the area sampled during MALDI. As a consequence reports of high-resolution sampling with both DART® and DESI have not supported the use of these technologies for examination of surfaces with high resolution.

Prior art in API-MS includes many different designs that combine the action of electrostatic potentials applied to needles, capillary inlets, and lenses as well as a plurality of lenses acting as ion focusing elements, which are positioned in the ion formation region to effect ion focusing post-ionization at atmospheric pressure. These electrostatic focusing elements are designed to selectively draw or force ions towards the mass spectrometer inlet by the action of the electrical field generated in that region of the source. Atmospheric pressure sources often contain multiple pumping stages separated by small orifices, which serve to reduce the gas pressure along the path that the ions of interest travel to an acceptable level for mass analysis. These orifices also operate as ion focusing lenses when electrical potentials are applied to the surface.

Current configuration of atmospheric pressure ionization (API) mass spectrometer inlets are designed to use either a capillary or small diameter hole to effectively suction ions and neutral molecules alike into the mass spectrometer for transmission to the mass analyzer. The use of metal, and glass capillaries to transfer ions formed at atmospheric pressure to high vacuum regions of a mass spectrometer is implemented on many commercially available mass spectrometers and widely applied in the industry. These metal and glass capillaries normally have a fixed diameter throughout their entire length. The function of the capillary tubing is to enable both transfer of ions in the volume of gas passing through the tube and to reduce the gas pressure from atmosphere down to vacuum pressures in the range of $10^{-3}$ torr or less required by the mass spectrometer. The flow of gas into and through the capillary is dependent on the length and the diameter of the capillary.

A surface is capable of being charged with a potential, if a potential applied to the surface remains for the typical duration time of an experiment, where the potential at the surface is greater than 50% of the potential applied to the surface. A vacuum of atmospheric pressure is 760 torr. Generally, 'approximately' in this pressure range encompasses a range of pressures from below $10^1$ atmosphere=$7.6\times10^3$ torr to $10^{-1}$ atmosphere=$7.6\times10^1$ torr. A vacuum of below $10^{-3}$ torr would constitute a high vacuum. Generally, 'approximately' in this pressure range encompasses a range of pressures from below $5\times10^{-3}$ torr to $5\times10^{-6}$ torr. A vacuum of below $10^{-6}$ torr would constitute a very high vacuum. Generally, 'approximately' in this pressure range encompasses a range of pressures from below $5\times10^{-6}$ torr to $5\times10^{-9}$ torr. In the following, the phrase 'high vacuum' encompasses high vacuum and very high vacuum.

In an embodiment of the present invention, a sampling system utilizes larger diameter tubing to provide for more conductance and thus more efficient transfer of ions and molecules into the spectrometer analysis system for measurement. In an embodiment of the present invention, a sampling system utilizes a narrow or restricted entrance followed by the larger diameter tubing region to reduce the potential for ions striking the surface of the tubing and thus providing a more efficient transfer of ions and molecules into the spectrometer analysis system for measurement. The utilization of larger diameter tube configurations enables the implementation of electrostatic fields inside the tube to further enhance collection and transfer of ions into the spectrometer system further improving the sensitivity of the system.

In an embodiment of the present invention, a narrow orifice tube with an electrical potential applied to its inside surface is positioned in close proximity to the surface of a sample to selectively collect ions from an area of interest while a second electrical potential, applied to the outer surface of the tube acts to deflect ions that are not generated in the area of interest away from the sampling inlet of the tube. In an embodiment of the present invention, the end of the sampling tube is shaped to provide for close proximity to the surface of a sample to selectively collect ions from an area of interest. In an embodiment of the present invention, the various sampling systems described permit more efficient collection of ions during the desorption process by improving the capability of the vacuum system to capture the ions.

A desorption ionization source 101 generates the carrier gas containing metastable neutral excited-state species, which are directed towards a target surface 111 containing analyte molecules as shown in FIG. 1. The metastable neutral excited-state species produced by a direct analysis real time (DART®) source are an example of an ionizing species produced by a component of the invention. However, the invention can use other ionizing species including a ions generated by a desorption electrospray ionization (DESI) source, a laser desorption source or other atmospheric pressure ionization sources such as a Corona or glow discharge source. The ionizing species can also include a mixture of ions and metastable neutral excited-state species. Those analyte molecules are desorbed from the surface 111 and ionized by the action of the carrier gas. Once ionized, the analyte ions are carried into the spectrometer system through the vacuum inlet 130.

The area of sample subject to the ionizing gas during desorption ionization is relatively large in both of the recently developed DART® and DESI systems. The capability to determine the composition of a specific area of sample is limited to a few cubic millimeters. In an embodiment of the present invention, a small diameter capillary tube can be positioned in close proximity to the sample in order to more selectively collect ions from a specific area. Unfortunately, use of reduced diameter capillary tube results in a decrease in the collection efficiency for the analysis.

Figure 13:
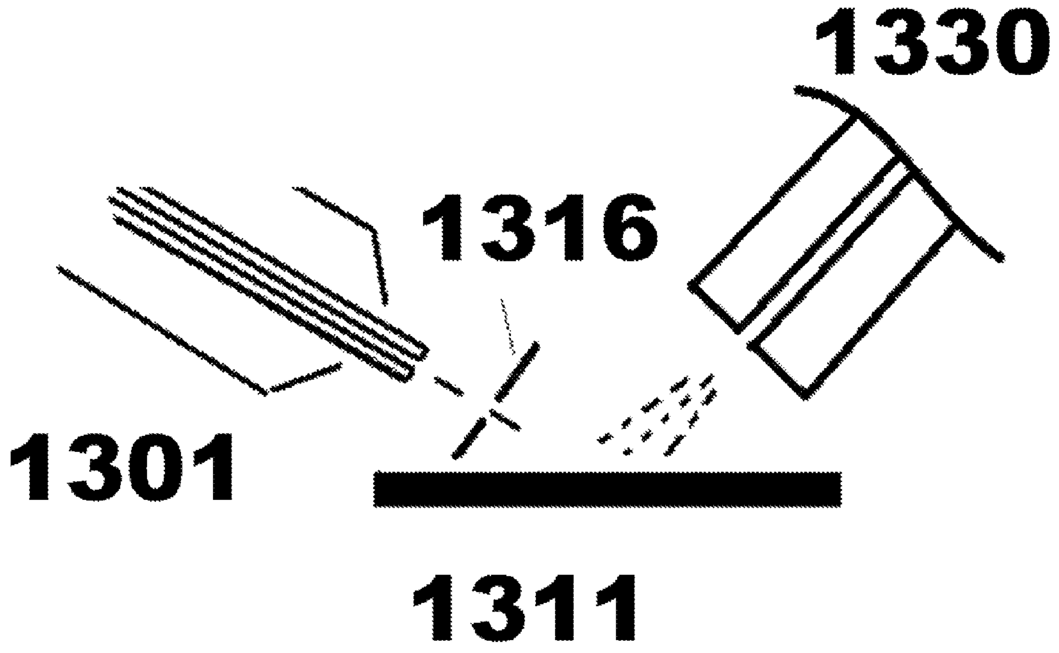
FIG. 13 is a schematic diagram an ion sampling device that provides for collection of ions and transmission of ions from their site of generation to the spectrometer system inlet showing a physical restriction of the gas being used to effect desorption ionization.

Alternative approaches to enable improved spatial sampling involve the use of a permeable physical barrier 1316 deployed to prevent ionization in areas that are out of the area of interest, as shown in FIG. 13. The permeable barrier can have a permeable physical barrier which allows an analyte to be inserted into the pores or otherwise adsorbed or absorbed. In an embodiment of the present invention, the metastable atoms or metastable molecules that exit the DART® source 1301 are partially shielded from the sample surface 1311 by the permeable physical barrier 1316. In an alternative embodiment of the present invention, a permeable physical barrier can be a slit located between the ionization source and the sample surface through which the ionizing gas passes. In an embodiment of the present invention, a permeable physical barrier is a variable width slit. In another embodiment of the present invention, a pinhole in a metal plate can be the permeable physical barrier. Once the gas has passed the barrier it can effect ionization of molecules on the surface. The ions produced are carried into the spectrometer system through the vacuum inlet 1330.

The material being used as a permeable physical barrier to block the desorption of molecules from area adjacent to the area of interest is exposed to the same ionizing atoms or molecules that are used to desorb and ionize molecules from the targeted area of the surface. In the case of DART®, these atoms and molecules are gases and not likely to condense on the surface, however in DESI special considerations must be taken to remove the liquids that might condense on the permeable physical barrier because these molecules might subsequently be ionized and thus contribute ions to the system. The accumulation of liquid on the permeable physical barrier might then result in new ions being generated from the permeable physical barrier surface. The effect of the presence of an electrical field on the barrier is that it might potentially reduce resolution of the sampling system since the charged ions in the DESI beam can be deflected while passing through the slit or orifice thus defeating the purpose of its use as a permeable physical barrier. Clearly, this situation is not ideal for accurate determination of the spatially resolving small areas of a surface.

In an embodiment of the invention, ions desorbed from the surface can be drawn into the spectrometer system through a device made from a single tube connected to the vacuum system of the spectrometer. In an embodiment of the invention, ions desorbed from the surface can be drawn into the spectrometer system through a device made from a plurality of tubes connected to the vacuum system of the spectrometer. In an embodiment of the invention, a tube is cylindrical in shape. In an embodiment of the invention, a tube is elliptical in shape. In an embodiment of the invention, a cylindrical tube can be used and the diameter of the cylinder can be greater than 100 microns. In an alternative embodiment of the invention, a cylindrical tube diameter of 1 centimeter can be used. In various embodiments of the invention, a cylindrical tube diameter greater than 100 microns and less than 1 centimeter can be used.

Figure 2:
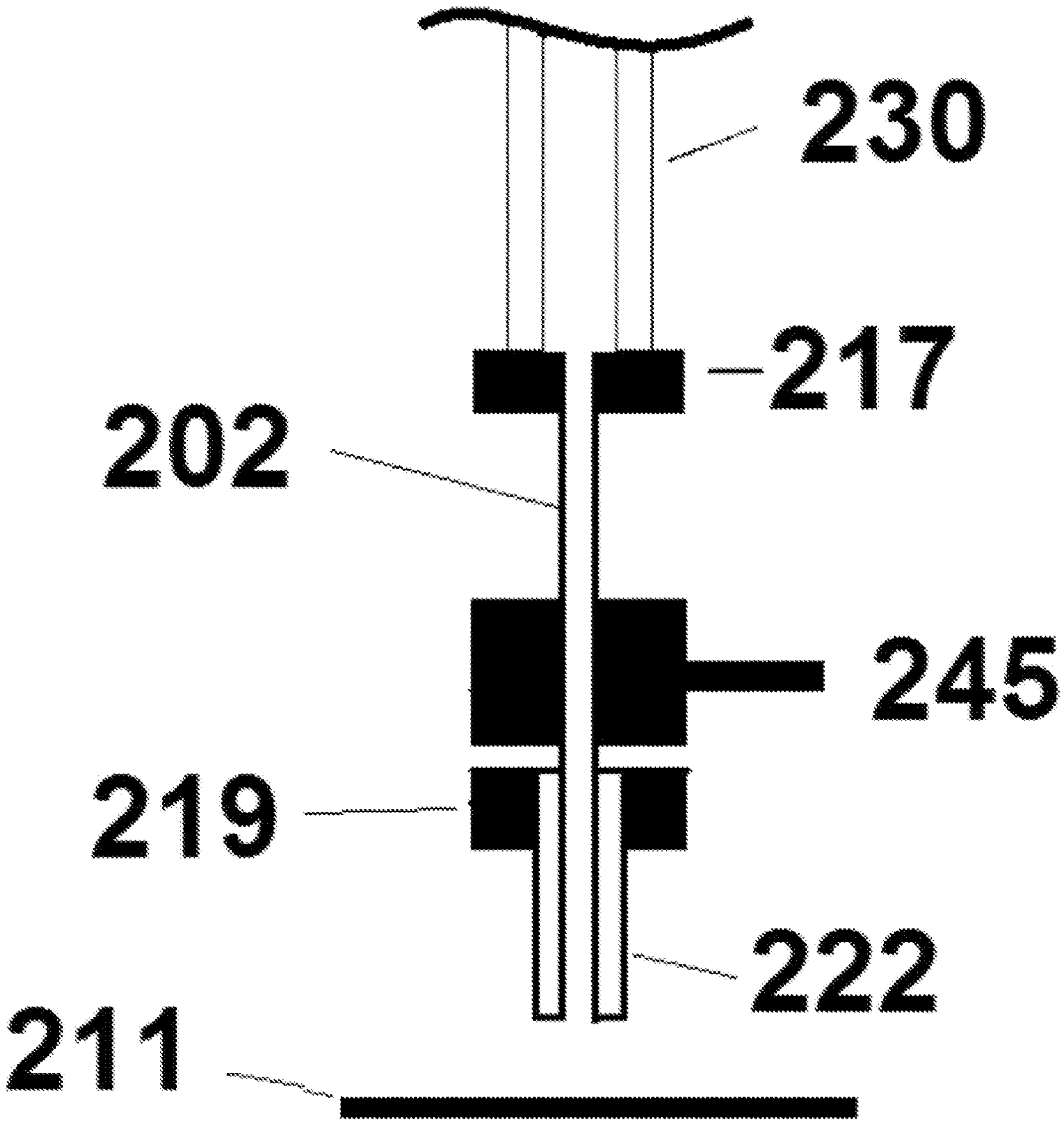
FIG. 2 is a schematic diagram of a sampling system incorporating a resistively coated glass tube with a modified external surface.

In an embodiment of the invention, a tube can be conical in shape with greater diameter at the sample inlet and smallest diameter at mass analyzer inlet. In an embodiment of the invention, a conical tube can be used and the smaller diameter can be 100 microns. In an alternative embodiment of the invention, a conical tube with largest diameter of 1 centimeter can be used. In various embodiments of the invention, a conical tube with smallest diameter greater than 100 microns and largest diameter less than 1 centimeter can be used. In an embodiment of the invention, a tube can be variegated in shape. In an embodiment of the invention, an inner surface of the tube or plurality of tubes can be capable of supporting an electrical potential which can be applied in order to retain and collimate ions generated during the desorption ionization process. FIG. 2 shows a device fabricated by using a resistively coated glass tube 202 the exterior surface of which has been coated with a conducting material such as a metal 222 to enable application of potential to the surface through an electrode 219 connected to the conducting material. Another electrode 217 is attached to the resistively coated tube in order to permit application of an electrical potential to the inside surface of the tube 202. The tube assembly can be positioned above the sample surface 211 by using a holder 245, which enables lateral and horizontal movement of the tube assembly to permit analysis of different sections of the sample. Once molecules are ionized during the desorption process are in the vapor phase they are either carried into the spectrometer system through the vacuum inlet 230 or deflected away from the entrance of the tube leading to the vacuum inlet if they are outside of the area of interest by the action of the electrical field applied to the external surface of the tube.

In an embodiment of the present invention, the diameter of the inner hole in the tube 222 can be changed to increase vacuum in the sampling region in order to capture ions and neutrals from a surface 211 being desorbed into the open end of a tube 202 in the sampler device. In an embodiment of the present invention, the diameter of the inner hole in the tube 230 can be changed to increase or decrease the gas flow between the sampling region and the mass spectrometer.

The movement of the tube using the holder 245 can be directed by a light source such as a laser or a light emitting diode affixed to the tube 202 or holder 245 which interacts with one or more photo detectors embedded in the surface 211. Once an integrated circuit senses the position of the tube 202 at various positions over the surface 211, a systematic sample analysis of the surface 211 can be carried out. A person having ordinary skill in the art can appreciate that such a device can have application for analysis of lab-on-a-chip' devices and in situ screening of samples of biological origin.

Resistively coated glass ion guides have been used in high vacuum regions of mass spectrometers. By design, the glass is fabricated into assemblies that result in ions being injected into the ion guide for transfer between locations in a vacuum system or as mass analyzers (e.g., in a reflectron or ion mirror). Resistively coated glass surfaces operated with the same polarity as the ions being produced act by directing the ions towards the lowest electrical potential, collimating them into a focused ion beam.

In an embodiment of the present invention, the potential applied to the inner surface of a resistively coated glass tube operated at atmospheric pressure acts to constrain and direct ions towards its entrance while at the same time pushing them towards the exit of the tube as the potential decreases along the length of the internal surface of the tube. In an embodiment of the present invention, by locating the tube near the area of desorption, and applying a vacuum to the exit end of a tube, more efficient collection of ions from a wider area results. In an alternative embodiment of the invention, collection of ions can be suppressed by the action of an electrical potential applied to a tube. In another embodiment of the invention, collection of ions can be suppressed by the action of a vacuum applied to the tube exit. In an embodiment of the present invention, application of a potential to the outer surface of the tube, which has been modified to support an electrical potential, results in deflection of ions that are not in the target location for capture results from the action of the electrical and vacuum components of the tube. In an alternative embodiment of the present invention, the application of a potential to the tube results in sampling only from a specified volume of the surface from which ions are being formed. In various embodiments of the present invention, differences in the diameter of tube and the vacuum applied to it serve to define the resolution of the sampling system. In an embodiment of the present invention, smaller diameter tubes result in higher resolution. In an embodiment of the present invention, larger diameter tubes permit collection of more ions but over a wider sample surface area.

Figure 3:
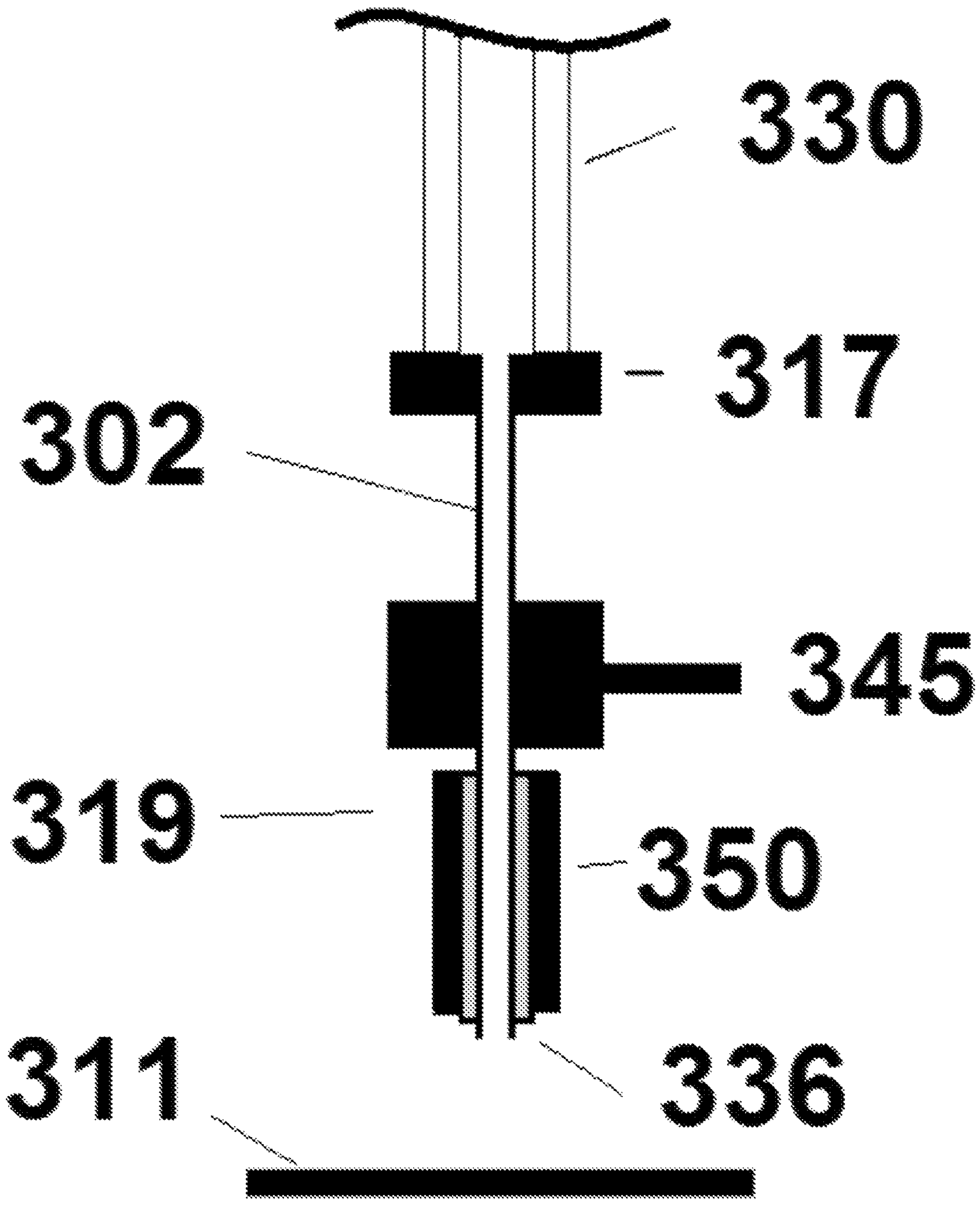
FIG. 3 is a schematic diagram of the sampling system incorporating a metal tube with an insulating external surface over which a second metal tube is placed.

FIG. 3 shows the sampling device fabricated by using electrical conducting tubes such as metal tubes. In an embodiment of the invention, ions desorbed from the surface can be drawn into the spectrometer system through a device made from a single conducting tube 302 of a diameter ranging from 100 micron to 1 centimeter where ions are desorbed from the surface 311 by the desorption ionization carrier gas (not shown). In an embodiment of the invention, the surface of the tube shall be capable of supporting an electrical potential which when applied acts to retain ions generated during the desorption ionization process. In order to deflect ions that are not formed in the specific sample area of interest from being collected into the tube 302 a second tube 350, electrically isolated from the original tube by a insulating material 336 is employed in a coaxial configuration as shown. A separate electrode 319 is attached to the exterior conducting surface 350. The second tube 350 covers the lower portion of the outer surface of the conducting tube 302. A second electrical potential of the same or opposite polarity is applied to this outer surface to provide a method for deflection of ions that are not produced from the sample surface area directly adjacent to the sampling end of the electrical conducting tube 302. An electrode 317 is attached to the tube 302 in order to permit application of an electrical potential to the inside surface of the tube. The outer tube can also be comprised of a conducting metal applied to the surface of the insulator. The tube assembly can be positioned above the sample surface 311 by using a holder 345, which enables lateral and horizontal movement of the tube assembly to permit analysis of different sections of the sample. Once ionized the analyte ions are carried into the spectrometer system through the vacuum inlet 330.

In an embodiment of the present invention, the potential applied to the inner surface can be negative while the potential applied to the outer surface can be positive. In this configuration positive ions formed in the area directly adjacent to the end of the conductive coated (e.g., metal) glass tube can be attracted into the tube, since positive ions are attracted to a negative potential while positive ions formed outside of the volume directly adjacent to the tube are deflected away from the sampling area thus preventing them from being collected and transferred to the spectrometer.

In an embodiment of the present invention, the potential applied to the inner surface can be positive while the potential applied to the outer surface can be negative. In this configuration negative ions formed directly in the area directly adjacent to the proximal end of the conductive (e.g. metal) coated glass tube can be attracted into the tube, since negative ions are attracted to positive potential while negative ions formed outside of the volume directly adjacent to the proximal end of the tube can be deflected away from the sampling area thus preventing them from being measured.

In an embodiment of the present invention, the use of a short piece of resistive glass can reduce the opportunity for ions of the opposite polarity to hit the inner surface of the glass and thus reduce potential losses prior to measurement.

Figure 4:
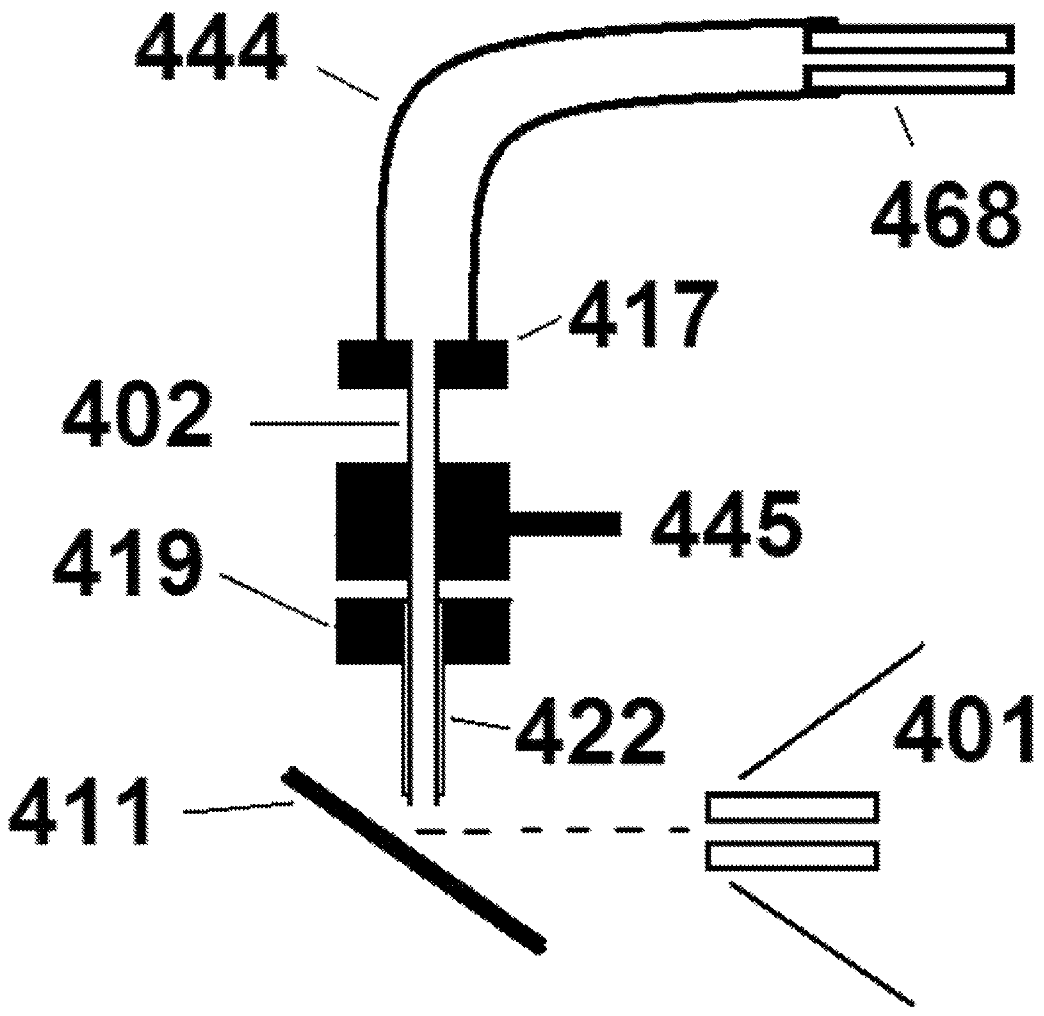
FIG. 4 is a schematic diagram of an ion sampling device configured to provide a path for ions from the sampling device to the inlet of an API-mass spectrometer through a flexible tube or segmented tube to permit flexibility in location of the sampling device with respect to the sample being subject to desorption ionization.
Figure 16:
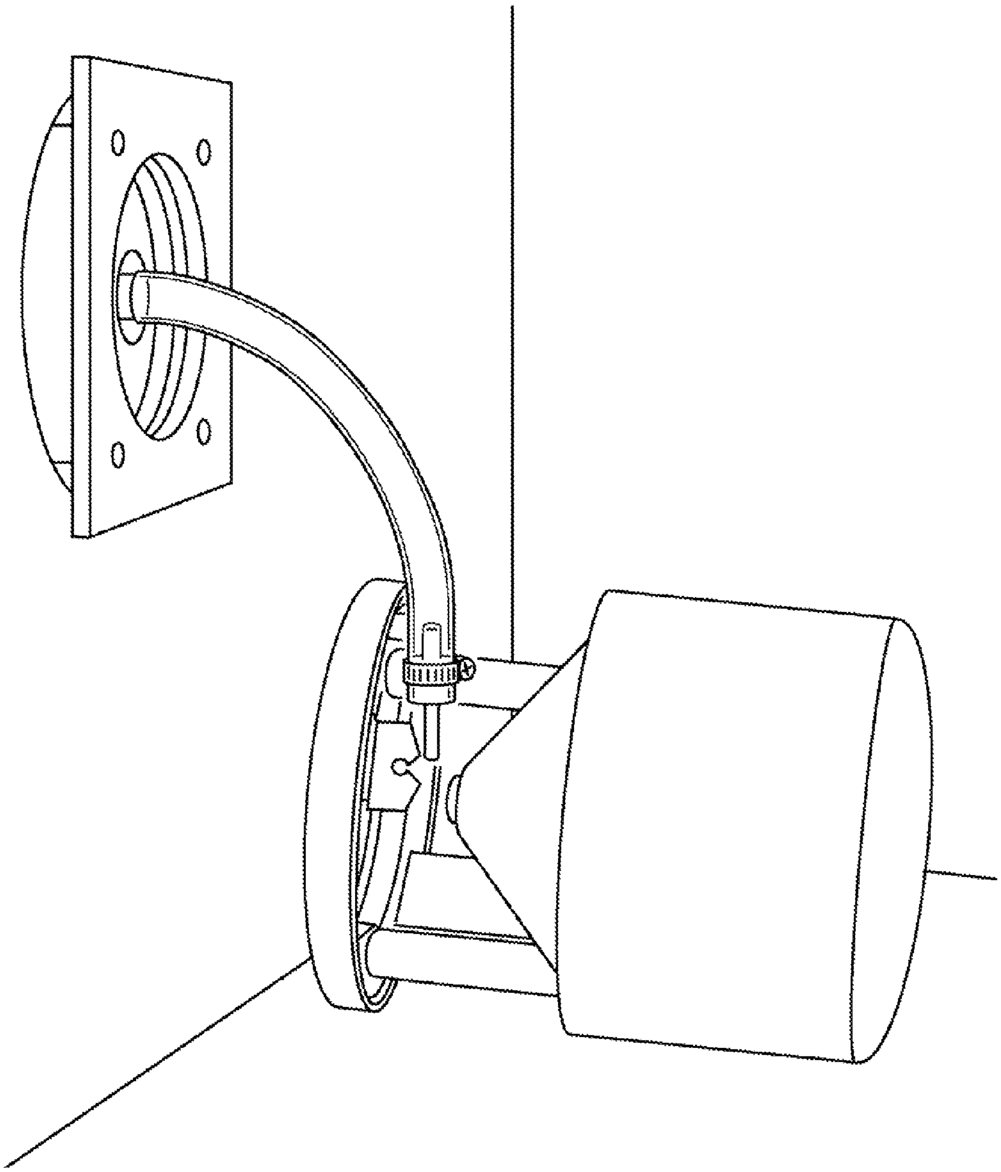
FIG. 16 is a line drawing of a flexible tube sampling system described in FIG. 2 with the proximal end of the tube being positioned in the ionization region of the DART® source and the distal end attached to the mass spectrometer atmospheric pressure inlet.
Figure 17:
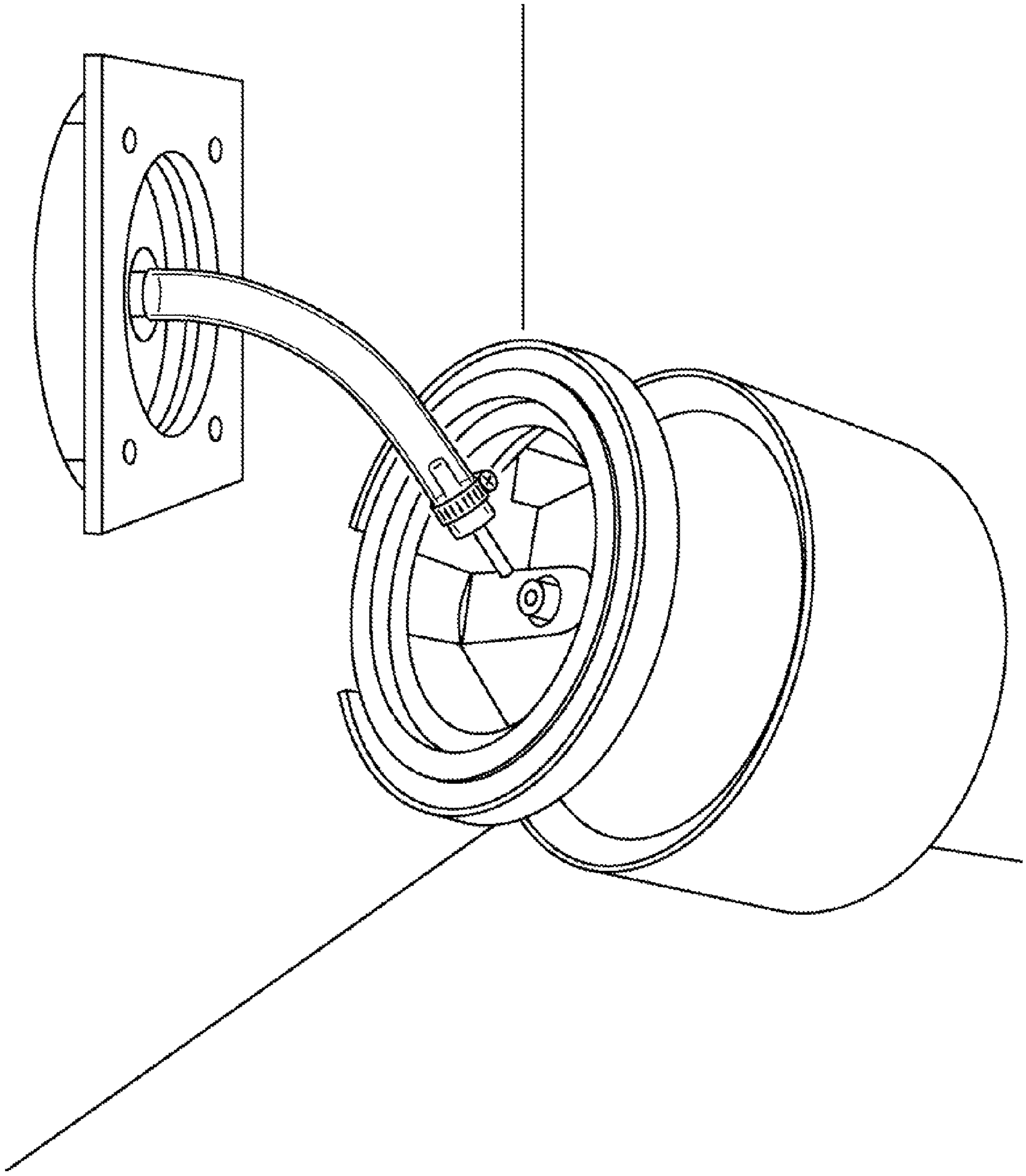
FIG. 17 is a line drawing of a flexible tube sampling system described in FIG. 2 with the proximal end of the tube being positioned at an angle to the exit opening for the ionization gas utilized by the DART® source.
Figure 18:
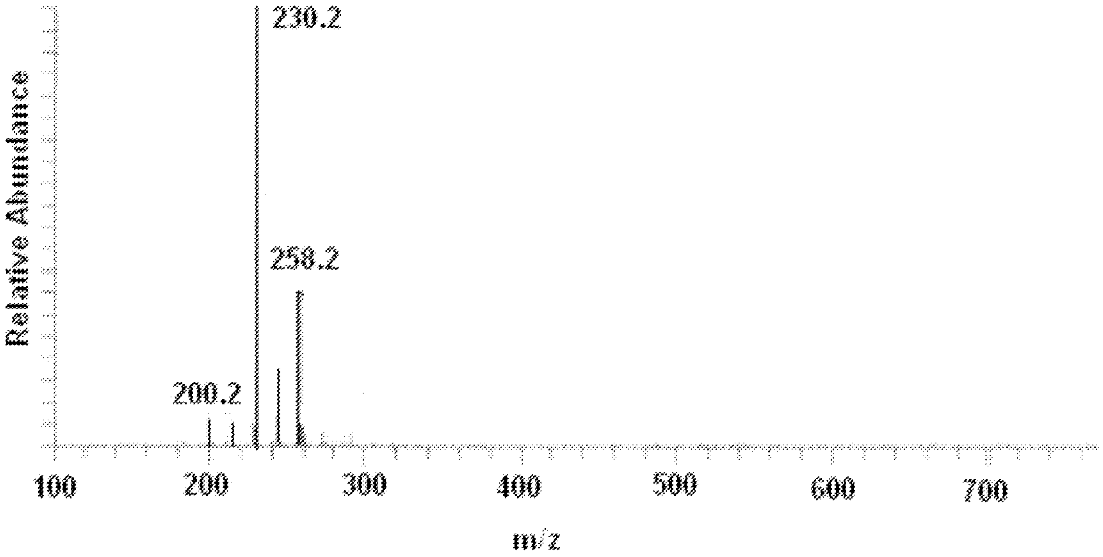
FIG. 18 is the surface desorption ionization mass spectrum of a sample of Tylenol® Extra Strength Rapid Release Gelcaps obtained using the flexible tube sampling system.
Figure 19:
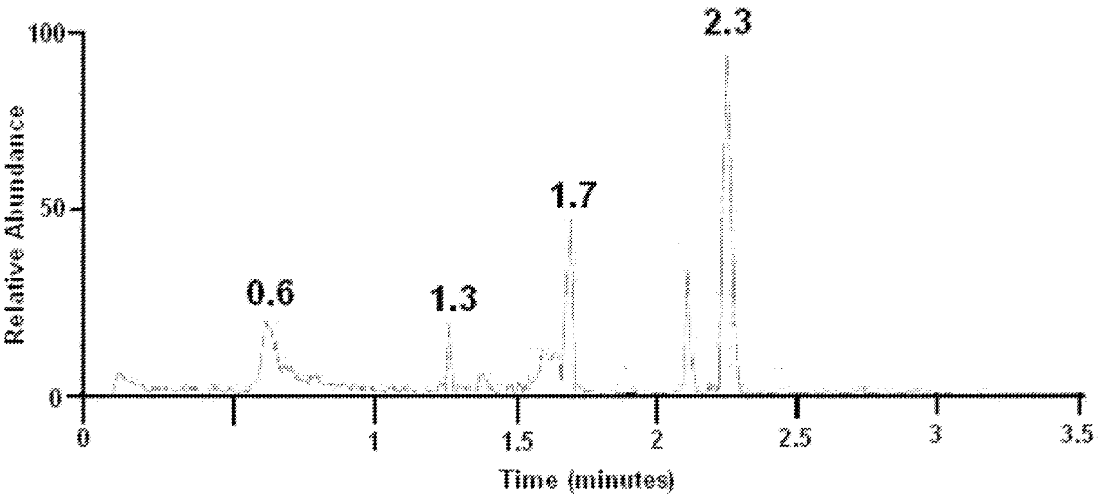
FIG. 19 is the Total Ion Chromatogram obtained during the surface desorption ionization at different positions including the gel surface at 1.7 minutes and the powder core dominated by polymeric excipient at 2.3 minutes of a Tylenol® Extra Strength Rapid Release Gelcaps obtained using the flexible tube sampling system.
Figure 20:
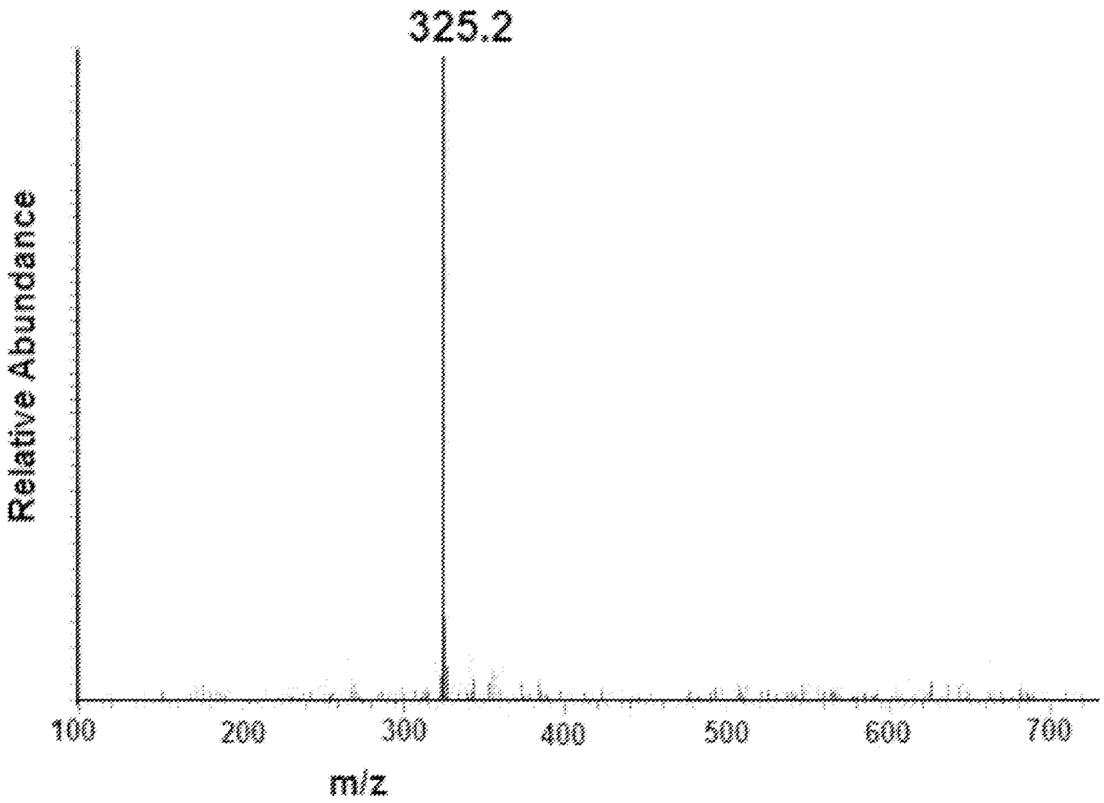
FIG. 20 is the surface desorption ionization mass spectrum of a sample of Quinine obtained using the flexible tube sampling system.
Figure 21:
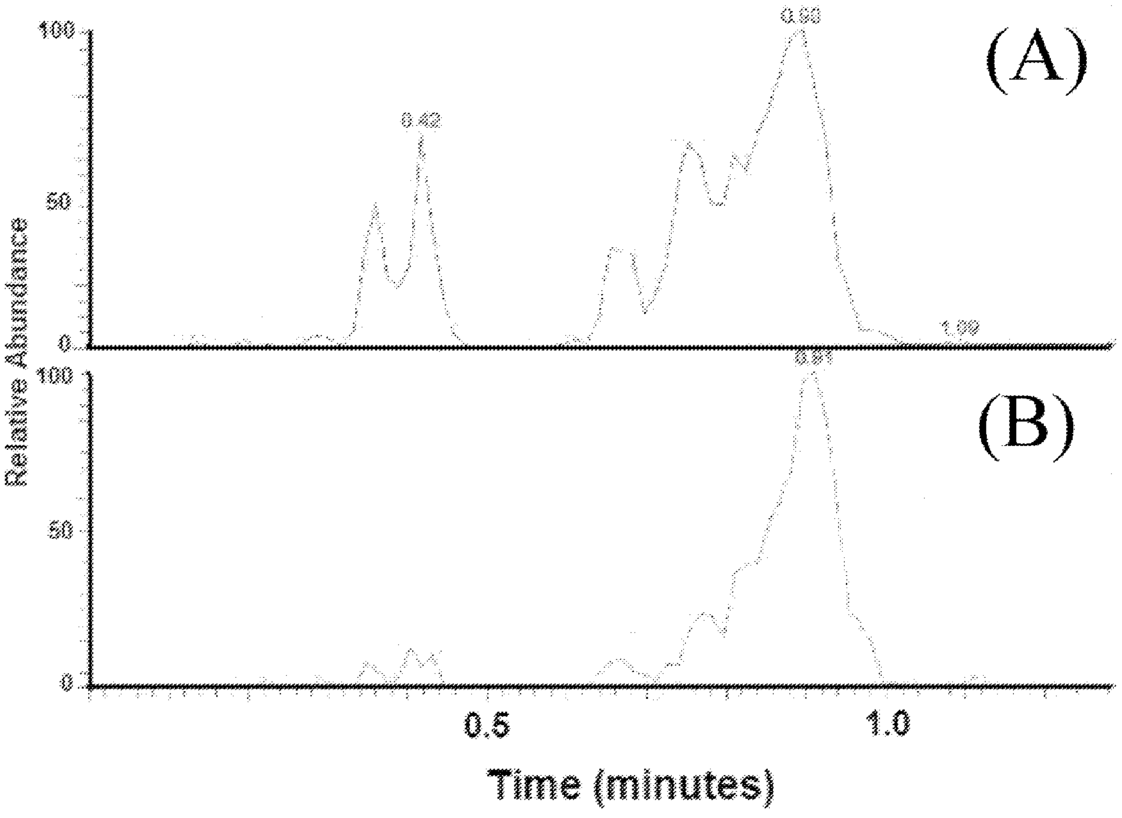
FIG. 21 is (A) the Total Ion Chromatogram and (B) the selected ion chromatogram obtained during the surface desorption ionization mass spectrum of a sample of Quinine obtained using the flexible tube sampling system.

In an embodiment of the present invention, the use of multiple segments of either flexible 444 or rigid tube can permit more efficient transfer of ions via a device made from a conductive coated (e.g., metal) tube 402, from the area where they are desorbed into the sampler device to the spectrometer analyzer 468, as shown in FIG. 4. In an embodiment of the present invention, the tube can be positioned to provide for desorption ionization sampling at a right angle to the carrier gas. In an embodiment of the present invention, the tube can be orientated 45 degrees to the surface being analyzed to provide for desorption ionization sampling as shown in FIG. 17. FIG. 18 is the surface desorption ionization mass spectrum of a sample of Tylenol® Extra Strength Rapid Release Gelcaps obtained using the flexible tube sampling system. FIG. 19 is the Total Ion Chromatogram obtained during the surface desorption ionization at different positions including the gel surface at 1.7 minutes and the powder core dominated by polymeric excipient at 2.3 minutes of a Tylenol® Extra Strength Rapid Release Gelcaps obtained using the flexible tube sampling system. FIG. 20 is the surface desorption ionization mass spectrum of a sample of Quinine obtained using the flexible tube sampling system. FIG. 21 is (A) the Total Ion Chromatogram and (B) the selected ion chromatogram obtained during the surface desorption ionization mass spectrum of a sample of Quinine obtained using the flexible tube sampling system. In an embodiment of the present invention, the tube can be orientated at a lower limit of approximately 10 degrees to an upper limit of approximately 90 degrees as shown in FIG. 16 to the surface being analyzed. In an embodiment of the present invention, the tube can be coiled 360 degrees or more with respect to the surface being analyzed. In an embodiment of the present invention, the tube can be attached at one end to the mass spectrometer vacuum system to provide suction for capture of ions and neutrals from a surface 411 being desorbed into the open end of a tube 402 in the sampler device. A desorption ionization source 401 generates the carrier gas containing metastable neutral excited-state species, which are directed towards a target surface containing analyte molecules. The tube assembly can be positioned above the sample surface 411 by using a holder 445, which enables lateral and horizontal movement of the tube assembly to permit analysis of different sections of the sample. An electrode 417 can be attached to the resistively coated tube 402 in order to permit application of an electrical potential to the inside surface of the tube. An electrode 419 can be attached to the external, conducting surface of the tube 422 in order to permit application of an electrical potential to the outer surface of the tube. The sampler device as enabled using a length of ¼ inch internal diameter Tygon tubing is shown in FIG. 16 and FIG. 17.

In an embodiment of the present invention, the use inner diameter of the first segment 402 of the multiple segment tube 444 is significantly less than the inner diameter of the next segment of the multiple tube. The reduced diameter of the proximal tube 402 acts to increase the velocity of the gas flowing into the next segment of the tube 444. The larger diameter tube 444, provides a region for the ions to transit that has a lower ratio of surface area to gas volume. The increased volume reduces the probability that the ions entrained in the flowing gas will collide with the inner wall of the segment of the tube 444. Connection of the distal end of the multi-segment tube to the mass spectrometer provides the vacuum to draw the gas and ions through the tube. Alternatively, the tube may be connected to a gas ion separator device to enable larger volumes of gas and ions to enter the proximal end of the tube. In an embodiment of the invention, the gas ion separator can be connected at the distal end of the tube. In an alternative embodiment, the gas ion separator can be inserted at a point between the proximal and the distal ends of the tube.

Figure 5:
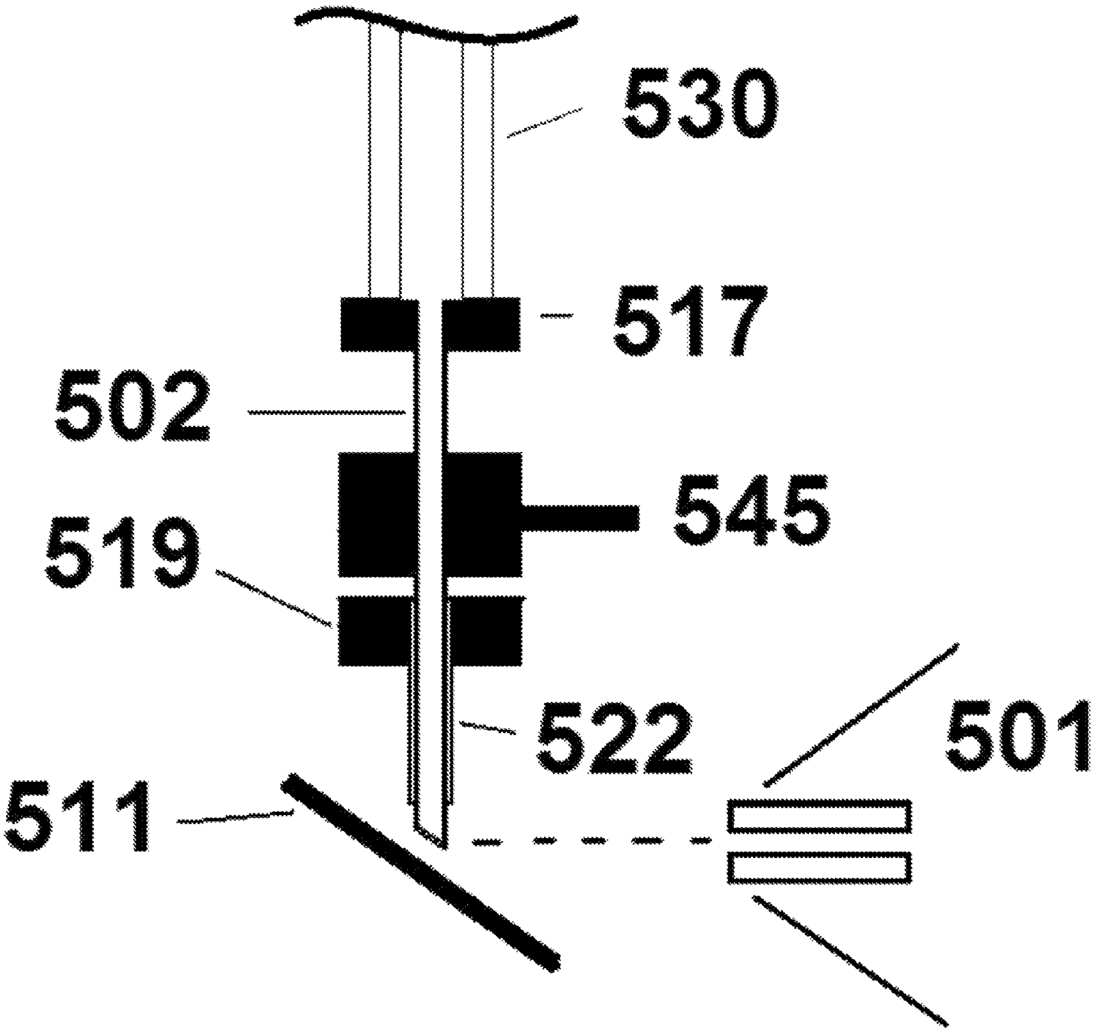
FIG. 5 is a schematic diagram of the configuration of the sampling device with a shaped entrance allowing for closer sampling of the sample.

In various embodiments of the present invention, sample desorption surfaces at a variety of angles are used to avoid complications associated with the use of slits and orifices described earlier (FIG. 13). In an embodiment of the present invention, a sample collection tube with its opening having an angle that more closely matches the angle at which the surface being analyzed 511 is positioned with respect to the ionization source is used to effect more efficient collection of the ions and neutrals formed during the desorption ionization process (FIG. 5). The use of a tube 502 the end of which has been designed and fabricated to be complimentary with respect to the angle of presentation of the surface 511 from which the ions are being desorbed can be attached at one end to the mass spectrometer vacuum system to provide more efficient collection of ions and neutrals from the surface as they are desorbed into the open end of the tube 502 in the sampler device. A desorption ionization source 501 generates the carrier gas containing metastable neutral excited-state species, which are directed towards a target surface containing analyte molecules. The tube assembly can be positioned above the sample surface 511 by using a holder 545, which enables lateral and horizontal movement of the tube assembly to permit analysis of different sections of the sample. An electrode 517 can be attached to the resistive coating tube 502 in order to permit application of an electrical potential to the inside surface of the tube. Once ionized the analyte ions are carried into the spectrometer system through the vacuum inlet 530. An electrode 519 can be attached to the external, conducting surface of the tube 522 in order to permit application of an electrical potential to the outer surface of the tube.

Figure 6:
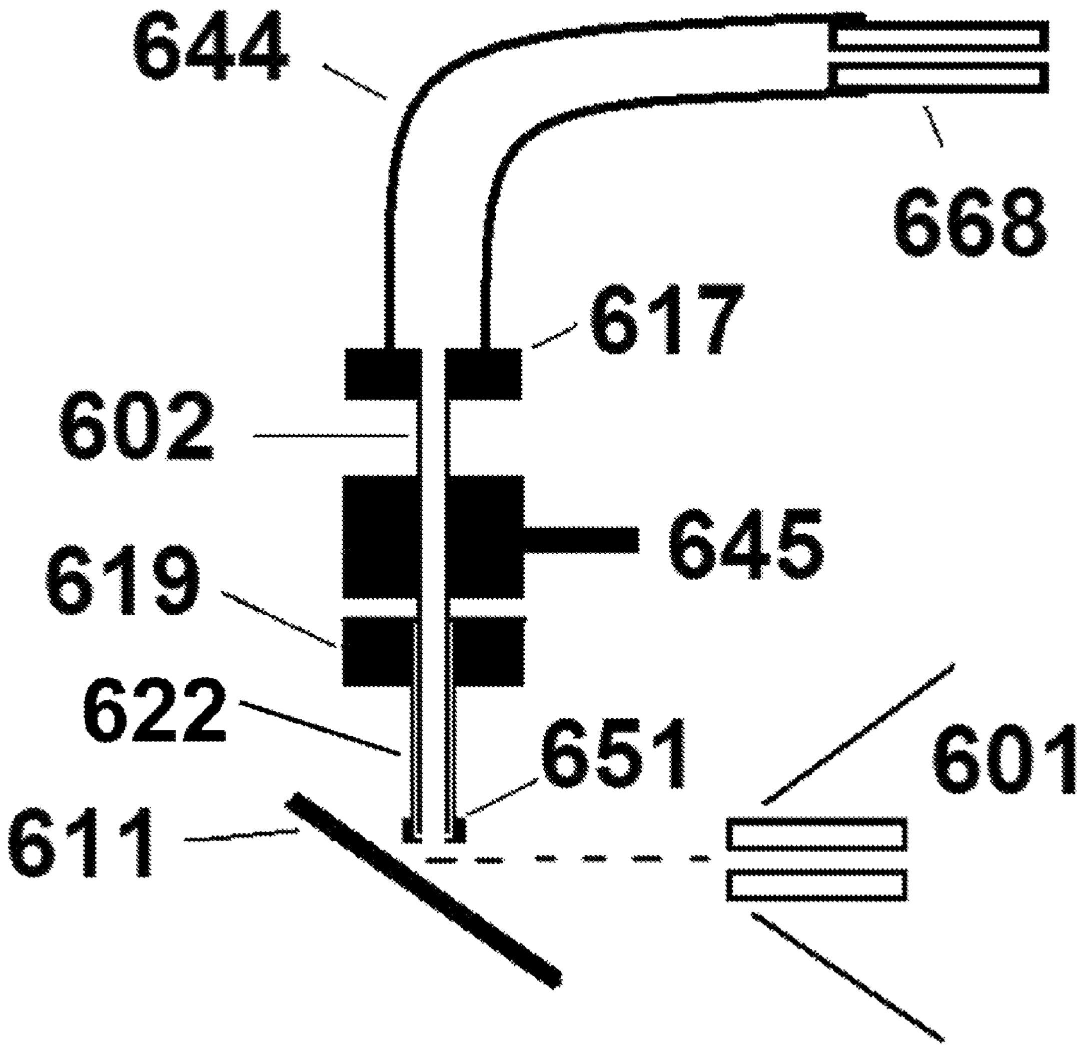
FIG. 6 is a schematic diagram of the configuration of the sampling device with a restricted dimension entrance at the sampling end allowing for higher resolution sampling of the sample.

In an embodiment of the invention, ions can be drawn into the spectrometer by an electrostatic field generated by applying a potential through an electrode 651 to a short piece of conducting tubing that is electrically isolated from a longer piece of conductive coated (e.g., metal) tubing to which an electrical potential of opposite potential to the ions being produced has been applied (as shown in FIG. 6). The short outer conducting tube is placed between the sample and the longer inner conducting tube 602 and has a diameter that is greater than the diameter of the inner tube 602. The diameter of the inner tube 602 can be between 100 micron and 1 centimeter. In an embodiment of the invention, ions desorbed from the surface 611 by the desorption ionization carrier gas from the ionization source 601 are initially attracted to the outer tube 651 however due to the relatively low electrical potential applied to the outer tube the ions pass into the inner tube 602. In an embodiment of the invention, the surface of the tube 602 can be capable of supporting an electrical potential which when applied acts to retain ions generated during the desorption ionization process. An electrode 619 can be attached to the external, conducting surface of the tube 622 in order to permit application of an electrical potential to the outer surface of the tube. An electrode 617 can be attached to the resistive outside coating of the inner tube 602 in order to permit application of an electrical potential to the inside surface of the tube. The tube assembly can be positioned above the sample surface 611 by using a holder 645, which enables lateral and horizontal movement of the tube assembly to permit analysis of different sections of the sample. Ions transit the tube 602 enter a transfer tube 644 that is either flexible or rigid providing for more efficient transfer of ions into the spectrometer system through the vacuum inlet 668.

High Throughput Sampling:

While DART® and DESI are attractive means of analyzing samples without any sample work-up, the sensitivity and selectivity can be significantly improved if a preparative step is introduced in the analysis protocol. For example, LCMS increases the ability to detect ions based on the chromatographic retention time and mass spectral characteristics. Similarly, selective sample retention prior to MS analysis can be important for improving the ability of DART® and DESI to distinguish samples. Further, selective sample retention can be important for improving surface ionization efficiency. In an alternative embodiment of the present invention, samples for DART®/DESI analysis are trapped by affinity interactions. In another embodiment of the present invention, samples for DART®/DESI analysis are trapped by non-covalent interactions. In various alternative embodiments of the present invention, samples for DART®/DESI analysis are trapped by covalent bonds. In an embodiment of the present invention, covalent bonds can be hydrolyzed prior to the sample measurement. In an alternative embodiment of the present invention, covalent bonds can be hydrolyzed simultaneous with the time of sample measurement. In another embodiment of the present invention, covalent bond vaporization or hydrolysis can occur due to the action of a desorption ionization beam of particles or light. In an embodiment of the present invention, chemically modified surfaces can be used to trap samples for DART®/DESI analysis.

In an embodiment of the present invention, a thin membrane of plastic material containing molecules of interest can be placed either in-line or along the transit axis of the beam of ionizing particles or light. In an embodiment of the present invention, a high temperature heated gas exiting the source of ionizing particles or light can be sufficient to liquefy or vaporize the material. In an embodiment of the present invention, a use of a high temperature to heat the gas for use in the DART® experiment can result in melting and/or pyrolysis of plastic polymer material releasing molecules which can be ionized by the action of the heated gas, where the ionized molecules can be detected by using a spectrometer.

Figure 7:
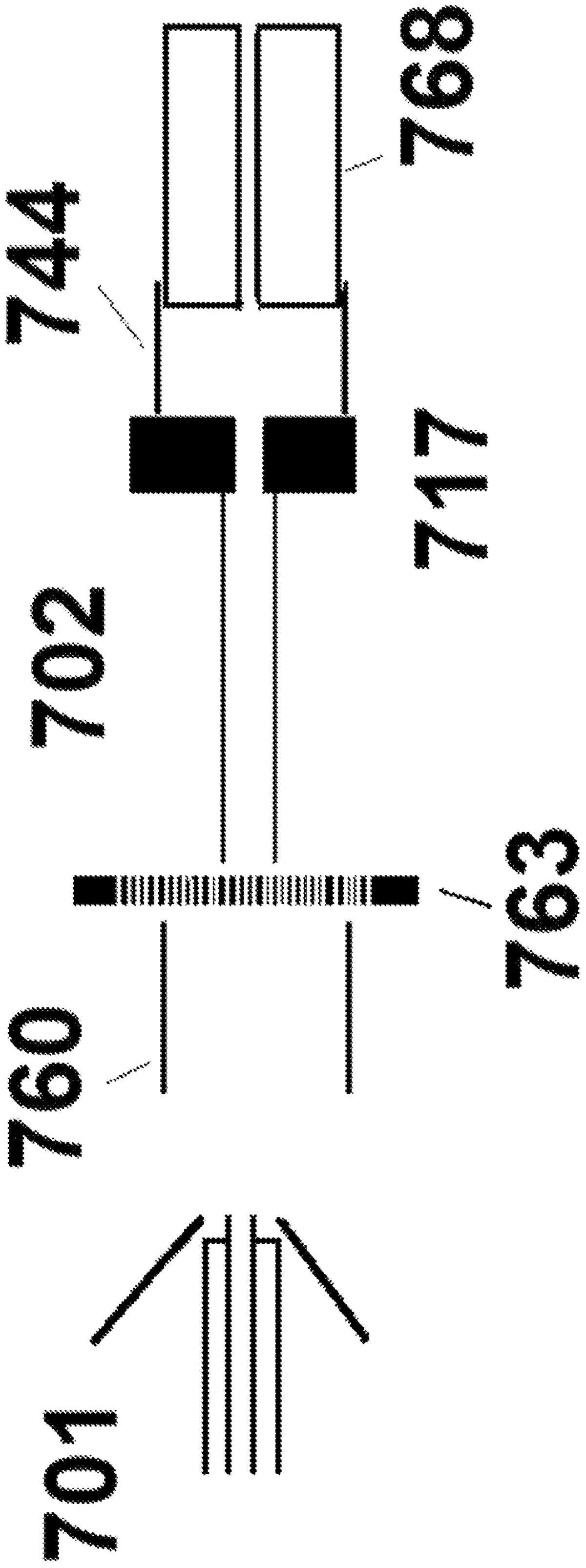
FIG. 7 is a schematic diagram showing a collimating tube placed between the desorption ionization source and the sample being analyzed with the sampling device being a permeable physical barrier with through channels into which sample has been deposited to enable positioning of a sample for desorption of ions from the sample.

In an embodiment of the present invention, if the sample is permeable, that is if ions formed from the sample on one surface can exit from another surface of the sample, then the beam of ionizing species can be directed at the sample positioned inside the sampling tube. As shown in FIG. 7, the tube 760 can have the sample 763 in direct line of the path of the ionizing species. With these samples the interaction of the desorption gas or charged ions as in the case of DART® and DESI respectively is completed with the sample as the gas or charged ions flow through the sample. In an embodiment of the invention, the metastable atoms or metastable molecules that exit the DART® source or the DESI desorption ion stream 701 are directed through a tube 760 to which an electrical potential may be applied to establish an electrostatic field that more effectively constrains the ions created during desorption from the sample 763 as shown in FIG. 7.

In an embodiment of the present invention, also illustrated by FIG. 7, a barrier made from a tube or plurality of parallel tubes 763 acts to provide a surface for desorption while constraining the area into which ions desorb, as they are formed in the tube. The tube or plurality of tubes can be made from metal or conductively coated glass. A potential may be applied so as to force the ions away from the distal end of the tube or plurality of tubes 763. The sample is applied to the tube or plurality of tubes 763 which is positioned between the source of the ionizing species 701 and the vacuum inlet of the mass spectrometer 768. The sample can be made to move so as to permit presentation of the entire surface or specific areas of the surface for desorption analysis. A device made from a conductive-coated (e.g., metal) tube 702 transmits the ions formed to a transfer tube 744 where they are drawn into the spectrometer through an API like-inlet 768. An electrode 717 can be attached to the resistively coated tube 702 in order to permit application of an electrical potential to the surface of the tube.

Figure 8:
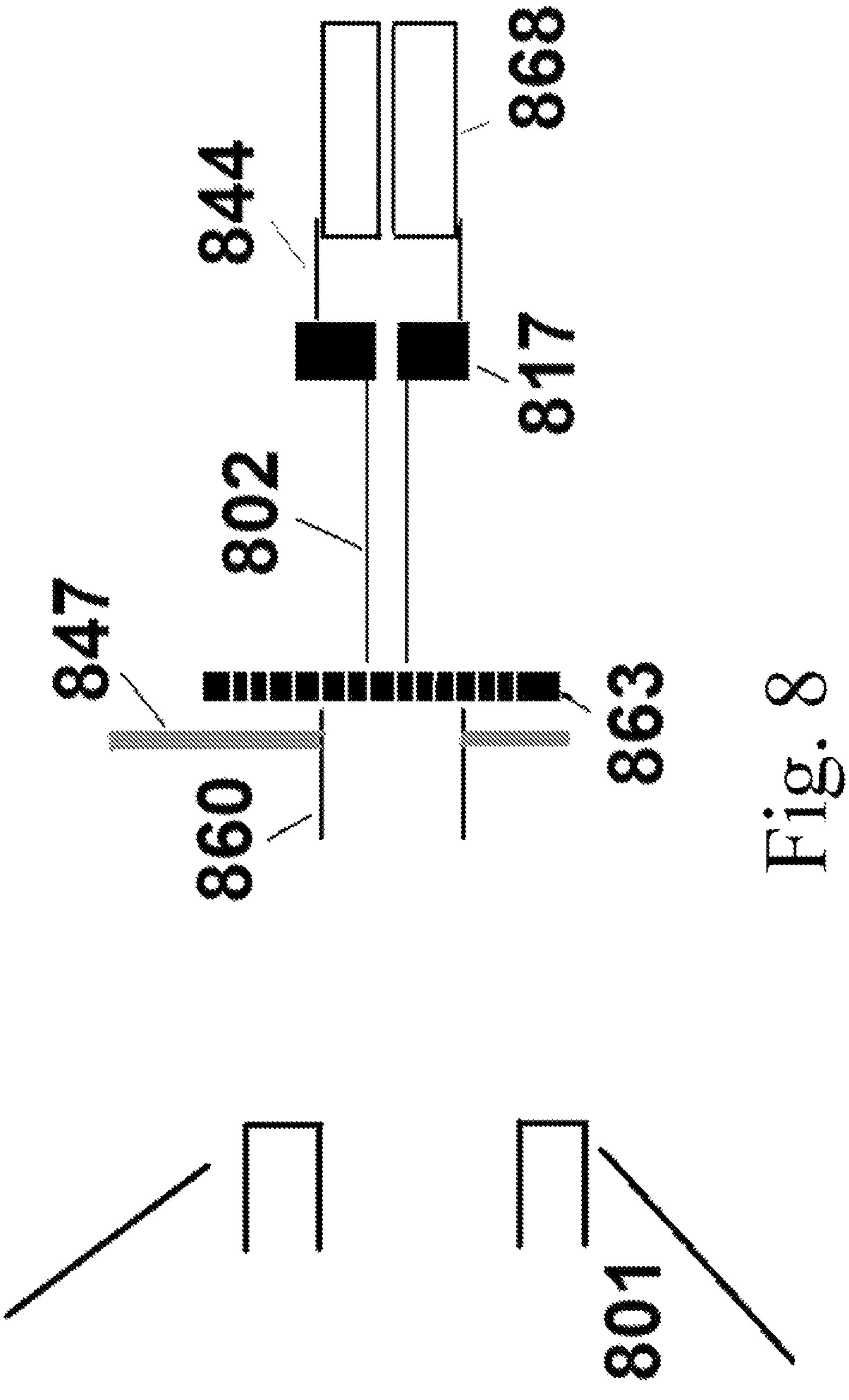
FIG. 8 is a schematic diagram showing a high resolution sampler with the collimating tube to which a mechanical shield has been attached to stop stray ionizing metastables and ions from striking the sampling device in order to limit the position from which ions are being desorbed.

In an embodiment of the invention, the metastable atoms or metastable molecules that exit the DART® source or the DESI desorption gas 801 are directed through a tube 860 to which an electrical potential can be applied establishing an electrostatic field that more effectively constrains the ions created during desorption from the sample 863 as shown in FIG. 8. In an embodiment of the present invention, in order to enable completion of higher resolution sampling of the surface, the diameter of tube 863 is reduced and a shield 847 is introduced to restrict the flow of the desorption ionizing gas to specific areas of the sample surface as shown in FIG. 8. A device made from a conductive-coated (e.g., metal) tube 802 transmits the ions into the API like-inlet 868 of the spectrometer system through a transfer tube 844. An electrode 817 can be attached to the resistively coated tube 802 in order to permit application of an electrical potential to the inside surface of the tube. In an embodiment of the present invention, the distance between the tube 860 and the electrode 802 can be adjusted to provide for optimum ion collection and evacuation of non-ionized material and molecules so they are not swept into the mass spectrometer inlet.

In various embodiments of the present invention, the sample 763, 863 can be a film, a rod, a membrane wrapped around solid materials made from glass, metal and plastic. In the case of a plastic membrane the sample can have perforations to permit flow of gas through the membrane. In an embodiment of the present invention, the action of the carrier gas from the ionization source can be sufficient to permit desorption of analyte from the membrane at low carrier gas temperatures. In an embodiment of the present invention, the action of the carrier gas can be sufficient to provide for simultaneous vaporization of both the membrane and the molecules of interest. In an embodiment of the present invention, the DART® gas temperature is increased to effect vaporization. In an embodiment of the present invention, the sample holder can be selected from the group consisting of a membrane, conductive-coated tubes, metal tubes, a glass tube and a resistively coated glass tube. In an embodiment of the present invention, the function of these sample supports can be to provide a physical mount for the sample containing the molecules of interest. In an embodiment of the present invention, the membrane holder can be a wire mesh of diameter ranging from 500 microns to 10 cm to which a variable voltage can be applied to effect electrostatic focusing of the ions towards the mass spectrometer atmospheric pressure inlet after they are formed.

Beams of ionizing species (including DART®, DESI and DAPCI) have been used for the desorption of molecules directly from solid surfaces of glass, metal, plastic, and even skin. However, these ionizing species have been utilized predominantly for desorption of ions from solid surfaces. Considerable difficulties were encountered when attempting to generate surface desorption results of solid powders and encapsulated chemical formulations. Others have used double sided tape, glues, viscous liquids, and other physical means to hold the solid in position during analysis. These approaches add other species and possible contaminants and were considered unattractive for these reasons and also would be difficult to incorporate in any process control analysis. Initial attempts to ionize these molecules were successful when the powder was first dissolved in solvents or otherwise modified to adhere to the surface using a foreign matter to affix those powders to the sampling target. Unfortunately, the use of solvents adds some complexity to the analysis since in many cases the solubility of the material being examined is unknown. There is also the case in the practice of analysis of certain materials including so-called "buckyballs" or fullerenes that the addition of solvents does not result in solubilization of the material, but potentially changes the chemical characteristic of the material prior to its analysis when the solvent molecule becomes captured by the fullerene. In the DART® experiment specifically, the necessity for fixing the sample to the surface is due to the use of high flow rates of gas directed at the sample and the potential that the gas will simply blow away the analyte prior to its being ionized by that same gas. Given the potential for failed analysis was high if the sample was not retained for sufficient time on the surface to permit the desorption ionization the investigation was directed to development of materials that would both support surface ionization and retain sample without altering its chemical structure or requiring its dissolution in solvent.

In an embodiment of the invention, a permeable physical barrier with a porous surface, to which a solid material has been in contact, has been utilized to provide the means for sampling by desorption ionization. In an embodiment of the invention, the contact between the porous surface of the permeable physical barrier results in the inclusion of small quantities of solid in the pores. Application of the solid sample can involve moving the solid sample across the surface of the porous material in which case a small residue of material becomes trapped in the channels of the permeable physical barrier. In an embodiment of the invention the permeable physical barrier is fabricated from glass tubes resulting in the presence of channels running from the front surface to which the sample is applied to the rear surface such that it is possible to allow an ionizing species such as a gas to freely flow through the length of the glass. In an embodiment of the invention the permeable physical barrier is fabricated from metal mesh resulting in the presence of large pockets on the front surface to which the sample is applied. The metal mesh is of such density that it is possible to allow gas to freely flow through its length with minimal resistance. The application of force sufficient to restrain the solid in the porous material of the sampler can be sufficient to result in deposition of the solid but not necessarily completely coat the permeable physical barrier.

During initial experiments using microchannel glass plates as sample surfaces for the DART® method samples were applied after dissolving them in water. Desorption of sample ions from this type of surface was observed to persist for much longer time periods than were observed by using a glass plate of similar size and mass. Subsequently, the effect of gas temperature on the desorption process was investigated and determined that at the same temperature samples desorbed from the permeable physical barrier lasted much longer than those from the glass plate surface. The trapping of analyte molecules in the permeable physical barrier appeared to enable longer sampling times and as a consequence longer sampling times enable a wider variety of spectroscopic investigations to be conducted and thus render the desorption ionization technique more useful.

Figure 14:
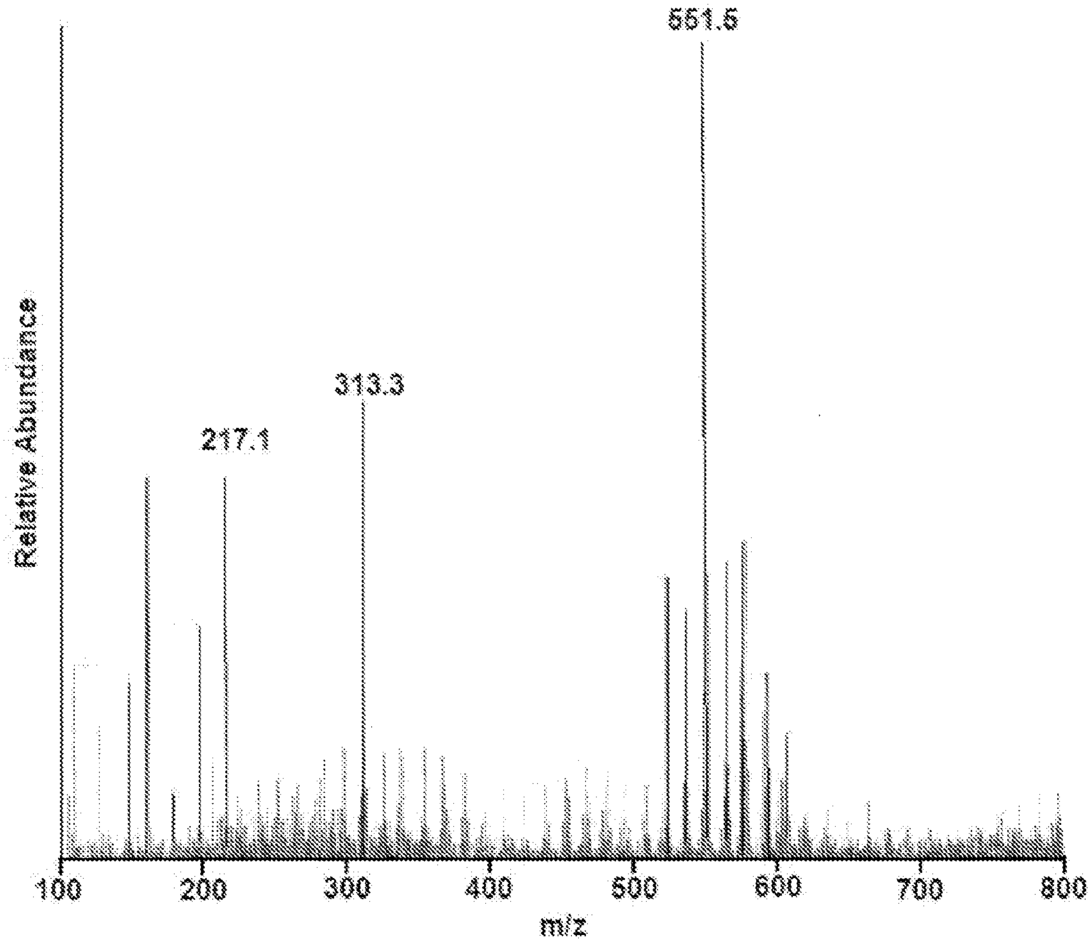
FIG. 14 is the surface desorption ionization mass spectrum for the a sample of microchannel glass plate when positioned in-line between the excited gas source and the atmospheric pressure inlet of the mass spectrometer.
Figure 15:
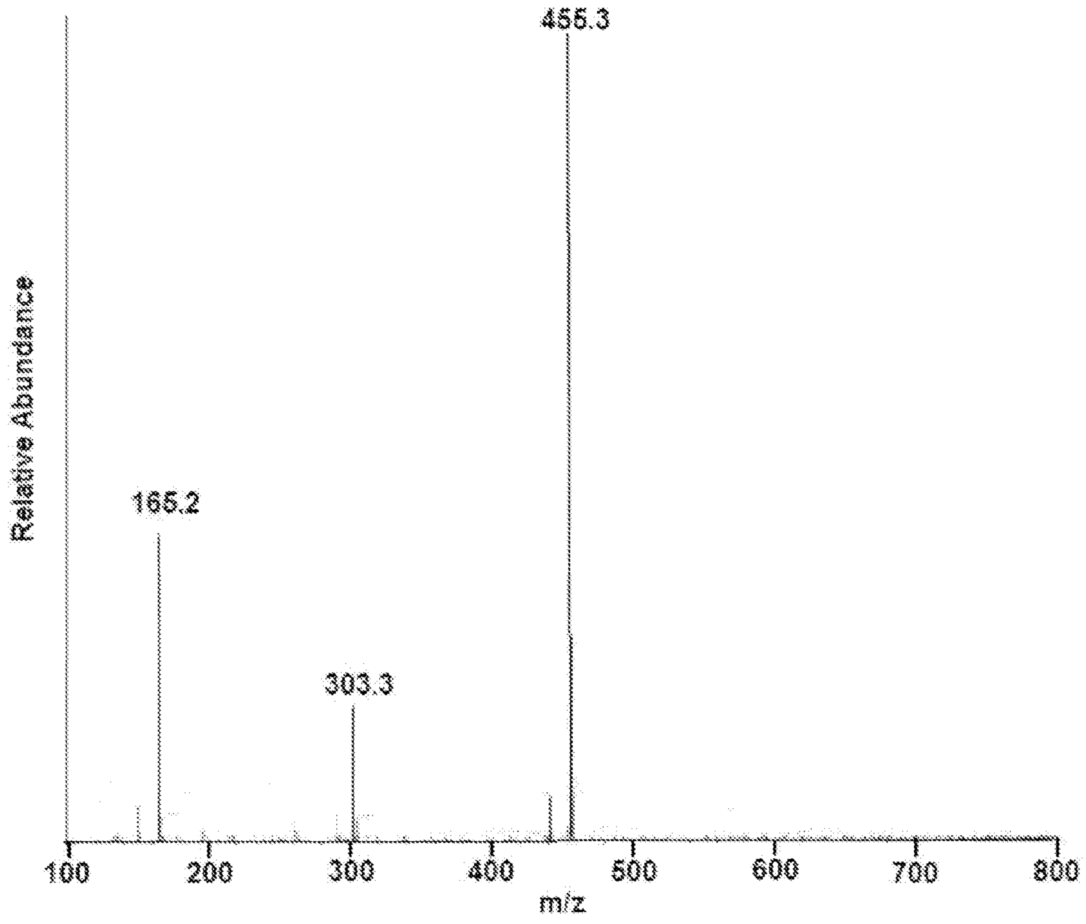
FIG. 15 is the surface desorption ionization mass spectrum for the a sample obtained after application of a sample of Verapamil to the surface of microchannel glass plate positioned in-line between the excited gas source and the atmospheric pressure inlet of the mass spectrometer.

In an embodiment of the invention, the permeable physical barrier being used as a sampler for the surface desorption ionization experiment is positioned with the microchannels collinear to the path of the ionizing metastables and ions exiting the DART® source. The ionizing gas strikes the surface of the porous target resulting in ionization of the analyte which is subsequently drawn through the plate or around it into the inlet of the spectroscopy system. The mass spectrum in FIG. 15 shows the mass spectrum obtained by DART® ionization of the solid preparation of Verapamil applied to the surface of a microchannel glass surface. FIG. 14 is the mass spectrum obtained from the desorption ionizaton of the microchannel glass surface prior to application of the solid sample. The presence of a significant number and quantity of species above the background is noted. The ionization of a solid sample in this configuration is observed to suppress the generation of background ions FIG. 15. Similar results have been obtained using permeable metal mesh and metal screens.

In an embodiment of the invention, the permeable physical barrier being used as a sampler for the surface desorption ionization experiment is positioned with the microchannels orthogonal to or at an angle to the path of the ionizing metastables and ions exiting the DART® source. The ionizing gas strikes the surface of the porous target resulting in ionization of the analyte which is subsequently drawn through the plate or around it into the inlet of the spectroscopy system.

Figure 9:
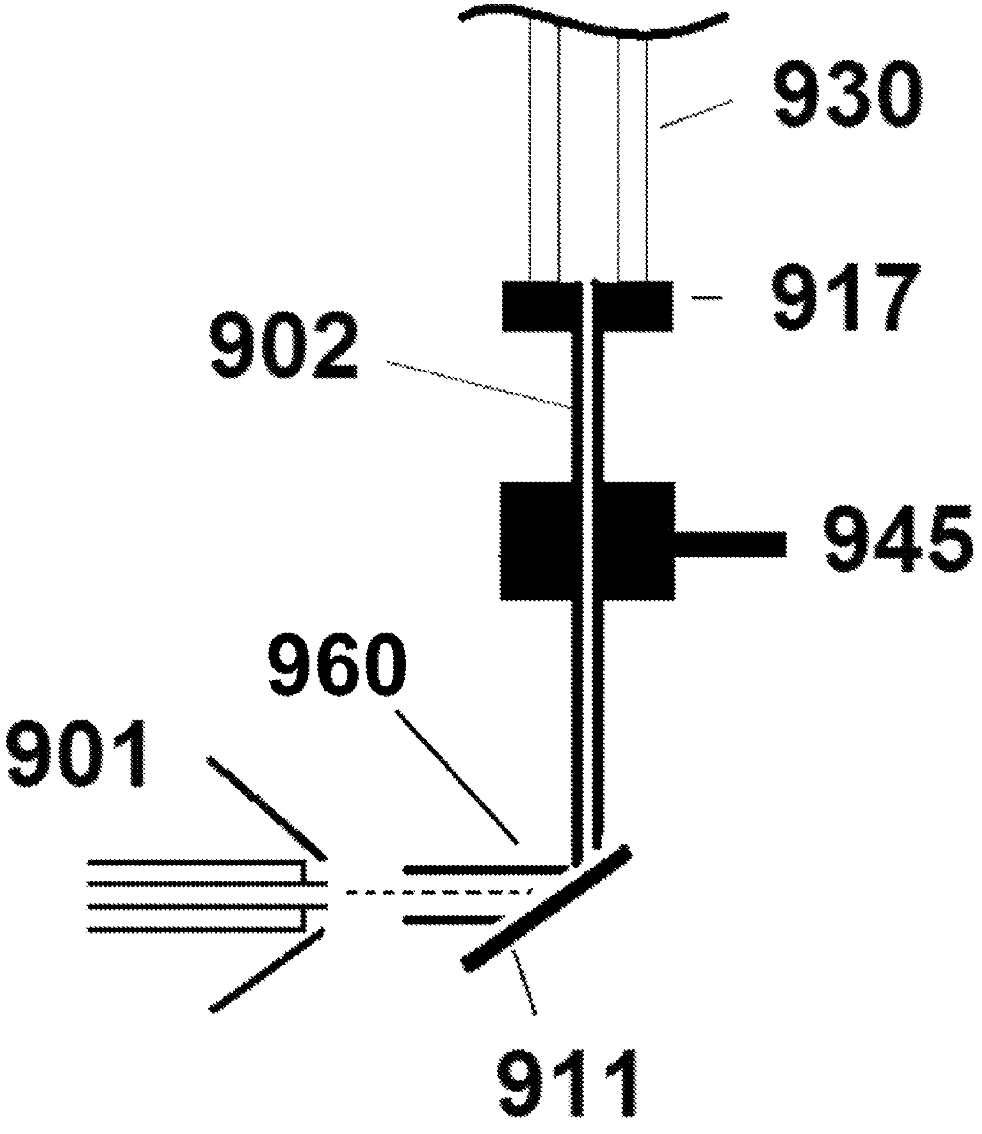
FIG. 9 is a schematic diagram of a off-axis sampling device including a collimating tube placed between the desorption ionization source and the sample being analyzed with the entrance of the spectroscopy system inlet being off-axis.

In an embodiment of the present invention, the sample can be placed at an angle in front of the desorption ionization source 901 as shown in FIG. 9. In an embodiment of the present invention, the sampling device 902 has a angled surface designed to provide for higher sampling efficiency where ions are being desorbed from the solid surface 911 by using the desorption gas being directed onto the sample surface through a tube 960 that acts to focus ions formed in the desorption event by the action of the electrostatic field maintained by the voltage applied to the tube. The tube can be made from conductive coated (e.g. metal) or resistively coated glass to which a potential can be applied so as to force the ions away from the tube. The tube assembly can be positioned above the sample surface 911 by using a holder 945, which enables lateral and horizontal movement of the tube assembly to permit analysis of different sections of the sample. An electrode 917 can be attached to the resistively coated tube 902 in order to permit application of an electrical potential to the inside surface of the tube. Once ionized the analyte ions are carried into the spectrometer system through the vacuum inlet 930. The target sample is positioned along the transit path of the flow of the DART® gas in a position where vaporization of the molecules from the target occurs. The sample can be made to move so as to permit presentation of the entire surface or specific areas of the surface for desorption analysis. Samples including but not limited to thin layer chromatography plates, paper strips, metal strips, plastics, Compact Disc, and samples of biological origin including but not limited to skin, hair, and tissues can be analyzed with different spatial resolution being achieved by using different diameter sampling tubes and sampling devices described in this invention.

In an embodiment of the present invention, the holder can be designed to permit holding multiple samples of the same or different type. In various embodiments of the present invention, the samples can be films, rods and membranes wrapped around solid materials made from glass, metal and plastic. In an embodiment of the present invention, the function of these sample supports can be to provide a physical mount for the sample containing the molecules of interest.

In another embodiment of the present invention, the sampling area can be evacuated by using a vacuum to effect removal of non-ionized sample and gases from the region. In an embodiment of the present invention, the vacuum can be applied prior to DART® or DESI sampling. In an embodiment of the present invention, the delay prior to applying DART® or DESI sampling can be between 10 ms and 1 s. In an embodiment of the present invention, the vacuum can be applied simultaneously with DART® or DESI sampling. In an embodiment of the present invention, the vacuum can be applied subsequent to DART® or DESI sampling. In an embodiment of the present invention, the delay subsequent to vacuuming the sample can be between 10 ms and 1 s.

In an embodiment of the present invention, a reagent gas with chemical reactivity for certain types of molecules of interest can promote the formation of chemical adducts of the gas to form stable pseudo-molecular ion species for analysis. Introduction of this reactive gas can be used to provide for selective ionization of molecules of interest at different times during the analysis of sample. In an embodiment of the present invention, the reagent gas selected for the analysis for certain types of molecules of interest has a specific chemical reactivity that results in the formation of chemical adducts between reagent gas atoms and molecules of interest to form stable pseudo-molecular ion species for spectroscopic analysis. In an embodiment of the present invention, a reagent gas can be selective for a class of chemicals. In an embodiment of the present invention, a reagent gas can be introduced into the sampling area prior to DART® or DESI sampling. In an embodiment of the present invention, the delay prior to DART® or DESI sampling can be between 10 ms and 1 s. In an embodiment of the present invention, a reagent gas can be introduced into the sampling area simultaneously with DART® or DESI sampling. In an embodiment of the present invention, a reagent gas can be introduced into the sampling area subsequent to commencing DART® or DESI sampling. In an embodiment of the present invention, the delay subsequent to introducing the reagent gas can be between 10 ms and 1 s. In an embodiment of the present invention, a reagent gas can be reactive with certain molecules.

In an embodiment of the present invention, the sample holder described in FIGS. 7-9 can be movable in the XY, and Z directions to provide the means for manipulation of the sample. In an embodiment of the present invention, the movable sampling stage can be used with either the ion collection device described in FIG. 2 and FIG. 3 or the ion-sampling device described in FIG. 9.

Figure 10:
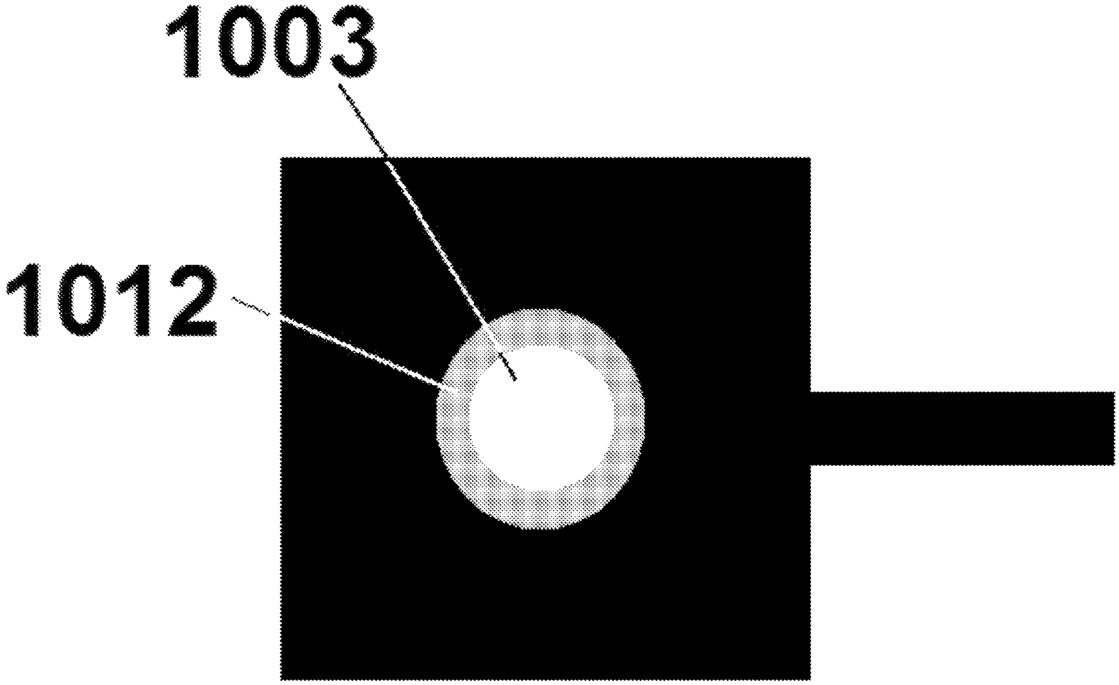
FIG. 10 is a schematic of the sample plate with a hole through it upon which sample is deposited for surface ionization.
Figure 11:
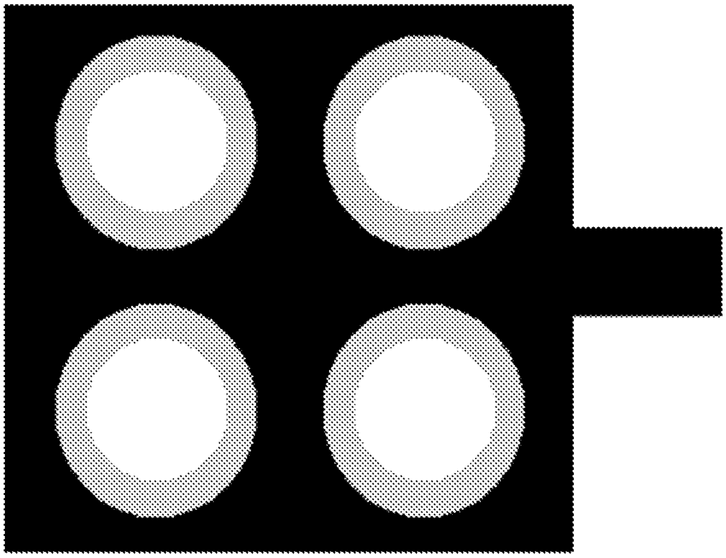
FIG. 11 is a schematic of the sample plate used to provide support for samples that are created from affinity-based selection of molecules of interest.

In an embodiment of the present invention, a sampling surface can have either a single perforation (FIG. 10) or a plurality of holes of the same or varied diameter (FIG. 11). The holes can be covered by a metal grid, a metal screen, a fibrous material, a series of closely aligned tubes fabricated from glass (FIG. 12), a series of closely aligned tubes fabricated from metal and a series of closely aligned tubes fabricated from fibrous materials all of which serve as surfaces to which sample can be applied for analysis. In an embodiment of the present invention, the design of a sample support material permits flow of ionizing gas over those surfaces adjacent to the perforation of holes in order to ionize the material on the surface being supported by that structure. In an embodiment of the present invention, flow of ionizing gas over those surfaces provides a positive pressure of the gas to efficiently push the ions and molecules desorbed from the surfaces into the volume of the sampling tube or mass spectrometer vacuum inlet.

A wide variety of materials are used to complete the selective isolation of specific components of mixtures from each other and display those isolates on a surface. In an embodiment of the present invention the area immediately adjacent to the holes 1003 in the sample surface can be coated with a layer comprising a chemical entity 1012, antibodies to certain proteins, or other molecules with selectivity for specific molecules of interest (FIG. 10). In an alternative embodiment of the present invention, rather than coating the sides of the wells as in FIG. 10, the bottom of the wells (corresponding to 1003) can be coated. In a normal DART® or DESI experiment these holes can be spaced at intervals of at least 1 mm in order to permit ionization from only one spot at a time. In an embodiment of the present invention the increased resolution of the sampling system enables higher spatial selection capability which enables positioning of samples of interest in close proximity such as is available with DNA and protein micro arrays and other lab on a chip devices where spacing of samples can be 2 to 20 microns apart. In an embodiment of the present invention, larger spacing is envisaged. In an embodiment of the present invention, increased resolution of sampling enables determination of the molecules of interest oriented in high-density arrays and molecules as they appear in complex samples such as biological tissues and nano-materials. In an alternative embodiment of the present invention, the sides of the wells as in FIG. 10 can be fabricated or coated with a porous material so as to permit physical constriction of powders and/or crystalline materials.

In an embodiment of the present invention, the increased resolution of the sampling device can be coupled together with a device for recognizing and directing the sampling device. In an embodiment of the present invention, a device for recognizing and directing the sampling device can be a photo sensor, which reads light sources emanating from the surface to be analyzed. In an embodiment of the present invention, a device for recognizing and directing the sampling device can be a light source directed onto photo sensors implanted in the surface to be analyzed.

Figure 12:
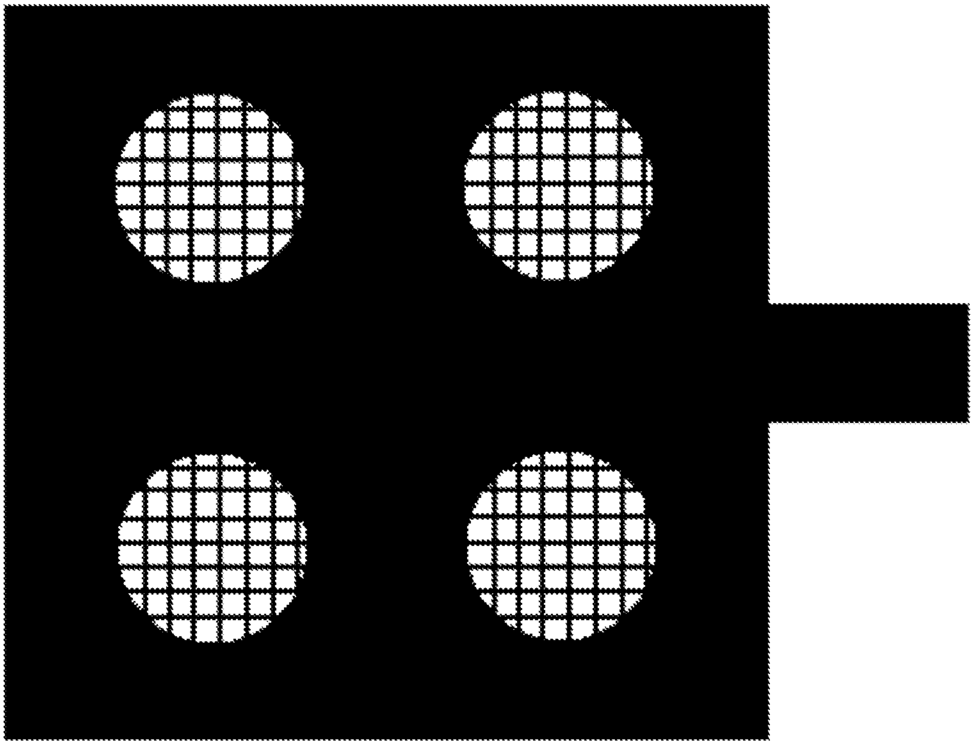
FIG. 12 is a schematic of the sample plate used to provide support for samples that are created from affinity-based selection of molecules of interest.

In an embodiment of the present invention, the perforated sampling surfaces described in FIGS. 10-12 may be directly attached by physical means to the proximal end of the sampling tubes 702 and 802 in FIGS. 7 and 8 respectively to enable a flow through sampling probe for use with desorption ionization.

What is claimed is:

1. A system for analyzing a sample, the system comprising:

an ionizing source for converting molecules of a sample into gas phase ions in a region at about atmospheric pressure;

an ion analysis device; and an ion transfer member operably coupled to a gas flow generating device, wherein the gas flow generating device produces a gas flow that transfers the gas phase ions through the ion transfer member to an inlet of the ion analysis device.

2. The system according to claim 1, wherein the ions are transferred over a significant distance.

3. The system according to claim 1, wherein the ions are sampled over a defined area.

4. The system according to claim 1, wherein the gas flow generating device is a pump that produces a high flow rate and a low compression ratio.

5. The system according to claim 1, wherein the gas flow generating device is a gas jet of the ionizing source.

6. The system according to claim 1, further comprising an electric focusing lens device operably coupled to the ion transfer member to facilitate transfer of ions to the inlet of the ion analysis device.

7. The system according to claim 6, wherein the electric focusing element facilitates focusing of the ions at the center of the transfer member during the transfer.

8. The system according to claim 1, wherein a distal end of the ion transfer member comprises a plurality of inlets for transferring ions from multiple locations to the inlet of the ion analysis device.

9. The system according to claim 1, wherein the ion transfer member is a tube.

10. The system according to claim 9, wherein the tube is composed of a rigid material.

11. The system according to claim 10, wherein the rigid material is metal or glass.

12. The system according to claim 9, wherein the tube is composed of a flexible material.

13. The system according claim 12, wherein the flexible material is tygon.

14. The system according to claim 1, wherein the ionizing source operates by a technique selected from the group consisting of: electrospray ionization, nano-electrospray ionization, atmospheric pressure matrix-assisted laser desorption ionization, atmospheric pressure chemical ionization, desorption electrospray ionization and electrospray-assisted laser desorption ionization.

15. The system according to claim 1, wherein the ion analysis device is selected from the group of a mass spectrometer, a handheld mass spectrometer, and an ion mobility ion analysis device.

16. The system according to claim 1, wherein the sample material is of at least one state selected from the group consisting of: solid phase, liquid phase, and gas phase.

17. The system according to claim 1, wherein the sample is of biological origin.

18. A system for analyzing a sample, the system comprising:

an ionizing source for converting molecules of a sample into gas phase ions in a region at about atmospheric pressure;

an ion analysis device; and an ion transfer member operably coupled to a gas flow generating device, wherein the gas flow generating device produces a gas flow that collects ions into the gas transfer member and transfers the gas phase ions through the ion transfer member to an inlet of the ion analysis device.

19. A method of analyzing a sample, the method comprising:

ionizing a sample to convert molecules of the sample into gas phase ions in a region at about atmospheric pressure;

providing an ion transfer member coupled to a gas flow generating device to produce a laminar gas flow that transfers the gas phase ions to an inlet of the ion analysis device; and analyzing the ions.

20. The method according to claim 19, wherein sample is ionized by a technique selected from the group consisting of: electrospray ionization, nano-electrospray ionization, atmospheric pressure matrix-assisted laser desorption ionization, atmospheric pressure chemical ionization, desorption electrospray ionization and electrospray-assisted laser desorption ionization.

* * * * *

US008421005C1

(12) EX PARTE REEXAMINATION CERTIFICATE (10644th)

United States Patent

Musselman

(10) Number: US 8,421,005 C1

(45) Certificate Issued: Jun. 30, 2015

(54) SYSTEMS AND METHODS FOR TRANSFER OF IONS FOR ANALYSIS

(75) Inventor: Brian D. Musselman, Melrose, MA (US)

(73) Assignee: IONSENSE INC., Saugus, MA (US)

Reexamination Request:
No. 90/013,220, Apr. 23, 2014

Reexamination Certificate for:

| | |
|---|---|
| Patent No.: | **8,421,005** |
| Issued: | **Apr. 16, 2013** |
| Appl. No.: | **12/709,157** |
| Filed: | **Feb. 19, 2010** |

Related U.S. Application Data

(63) Continuation of application No. 11/754,158, filed on May 25, 2007, now Pat. No. 7,714,281, and a continuation of application No. 11/754,189, filed on May 25, 2007, now Pat. No. 7,705,297.

(60) Provisional application No. 60/808,609, filed on May 26, 2006.

(51) Int. Cl.

| | |
|---|---|
| ***B01D 59/44*** | (2006.01) |
| ***H01J 49/00*** | (2006.01) |
| ***H01J 49/02*** | (2006.01) |

(52) U.S. Cl.
CPC ........... *H01J 49/025* (2013.01); *H01J 49/0036* (2013.01)

(58) Field of Classification Search
None
See application file for complete search history.

(56) References Cited

To view the complete listing of prior art documents cited during the proceeding for Reexamination Control Number 90/013,220, please refer to the USPTO's public Patent Application Information Retrieval (PAIR) system under the Display References tab.

*Primary Examiner* — Tuan H Nguyen

(57) ABSTRACT

The present invention is a device to restrict the sampling of analyte ions and neutral molecules from surfaces with mass spectrometry and thereby sample from a defined area or volume. In various embodiments of the present invention, a tube is used to sample ions formed with a defined spatial resolution from desorption ionization at or near atmospheric pressures. In an embodiment of the present invention, electrostatic fields are used to direct ions to either individual tubes or a plurality of tubes positioned in close proximity to the of the sample being analyzed. In an embodiment of the surface present invention, wide diameter sampling tubes can be used in combination with a vacuum inlet to draw ions and neutrals into the spectrometer for analysis. In an embodiment of the present invention, wide diameter sampling tubes in combination with electrostatic fields improve the efficiency of ion collection.

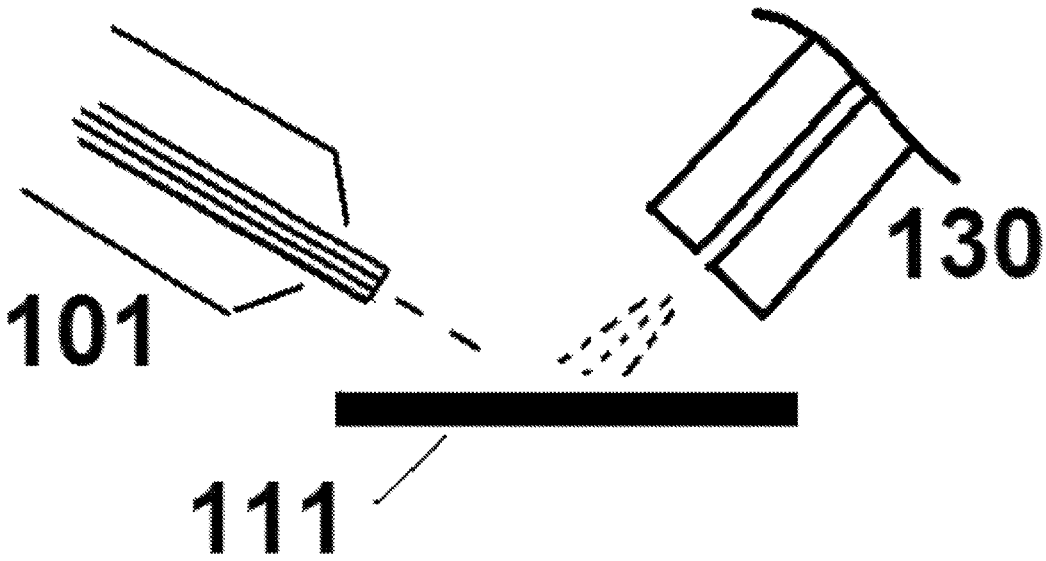

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 3, lines 56-60:

FIG. 16 is a line drawing of [a] *an approximately 3 decimeter* flexible tube sampling system described in FIG. 2 with the proximal end of the tube being positioned in the ionization region of the DART® source and the distal end attached to the mass spectrometer atmospheric pressure inlet;

Column 10, line 29 to column 11, line 11:

In an embodiment of the present invention, the use of multiple segments of either flexible 444 or rigid tube can permit more efficient transfer of ions via a device made from a conductive coated (e.g., metal) tube 402, from the area where they are desorbed into the sampler device to the spectrometer analyzer 468, as shown in FIG. 4. In an embodiment of the present invention, the tube can be positioned to provide for desorption ionization sampling at a right angle to the carrier gas. In an embodiment of the present invention, the tube can be orientated 45 degrees to the surface being analyzed to provide for desorption ionization sampling as shown in FIG. 17. FIG. 18 is the surface desorption ionization mass spectrum of a sample of Tylenol® Extra Strength Rapid Release Gelcaps obtained using the flexible tube sampling system. FIG. 19 is the Total Ion Chromatogram obtained during the surface desorption ionization at different positions including the gel surface at 1.7 minutes and the powder core dominated by polymeric excipient at 2.3 minutes of a Tylenol® Extra Strength Rapid Release Gelcaps obtained using the flexible tube sampling system. FIG. 20 is the surface desorption ionization mass spectrum of a sample of Quinine obtained using the flexible tube sampling system. FIG. 21 is (A) the Total Ion Chromatogram and (B) the selected ion chromatogram obtained during the surface desorption ionization mass spectrum of a sample of Quinine obtained using the flexible tube sampling system. In an embodiment of the present invention, the tube can be orientated at a lower limit of approximately 10 degrees to an upper limit of approximately 90 degrees as shown in FIG. 16 to the surface being analyzed. In an embodiment of the present invention, the tube can be coiled 360 degrees or more with respect to the surface being analyzed. In an embodiment of the present invention, the tube can be attached at one end to the mass spectrometer vacuum system to provide suction for capture of ions and neutrals from a surface 411 being desorbed into the open end of a tube 402 in the sampler device. A desorption ionization source 401 generates the carrier gas containing metastable neutral excited-state species, which are directed towards a target surface containing analyte molecules. The tube assembly can be positioned above the sample surface 411 by using a holder

445, which enables lateral and horizontal movement of the tube assembly to permit analysis of different sections of the sample. An electrode 417 can be attached to the resistively coated tube 402 in order to permit application of an electrical potential to the inside surface of the tube. An electrode 419 can be attached to the external, conducting surface of the tube 422 in order to permit application of an electrical potential to the outer surface of the tube. The sampler device as enabled using a length of ¼ inch (*approximately 6.35 millimeter*) internal diameter Tygon tubing is shown in FIG. 16 and FIG. 17.

Column 17, line 62:

*In an embodiment of the present invention a device for analyzing an analyte on a first surface comprises a component for generating a plurality of ionizing species, wherein the plurality of ionizing species are directed at the analyte to form analyte ions, wherein the analyte is at approximately atmospheric pressure. The device further comprises a tube with a proximal end and a distal end, wherein the distal end of the tube is positioned to transfer analyte ions into a spectrometer and a light source affixed to the tube, wherein the proximal end of the tube is positioned based on the light source illuminating the first surface, wherein when the proximal end of the tube is positioned such that one or more analyte ions pass through the tube into the spectrometer, wherein the tube is a length of between a lower limit of approximately* $10^{-2}$ *m (1 centimeter) and an upper limit of approximately 3 meters.*

*In an embodiment of the present invention a device for analyzing an analyte on a first surface comprises a component for generating a plurality of ionizing species, wherein the plurality of ionizing species are directed at the analyte to form analyte ions, wherein the analyte is at approximately atmospheric pressure. The device further comprises a tube with a proximal end and a distal end, wherein the distal end of the tube is positioned to transfer analyte ions into a spectrometer and a light source affixed to the tube, wherein the proximal end of the tube is positioned based on the light source illuminating the first surface, wherein when the proximal end of the tube is positioned such that one or more analyte ions pass through the tube into the spectrometer, wherein the diameter of the tube is between a lower limit of approximately* $10^{-4}$ *m and an upper limit of approximately* $10^{-1}$ *m (1 decimeter).*

AS A RESULT OF REEXAMINATION, IT HAS BEEN DETERMINED THAT:

Claims 1-4, 8, 18 and 19 are determined to be patentable as amended.

Claims 5-7, 9-17 and 20, dependent on an amended claim, are determined to be patentable.

New claims 21-31 are added and determined to be patentable.

1. A system for analyzing a sample, the system comprising:

an ionizing source for converting molecules of a sample into gas phase ions in a region at about atmospheric pressure;

an ion analysis device; and an ion transfer member *with a lower limit of at least approximately 6.35 millimeter internal diameter, and with an upper limit of approximately 1 decimeter internal diameter* operably coupled to a gas flow generating device, wherein the gas flow generating device produces a gas flow that transfers the gas phase ions through the ion transfer member to an inlet of the ion analysis device.

2. The system according to claim 1, wherein the ions are transferred over a [significant] distance *of approximately 3 decimeter*.

3. The system according to claim 1, wherein the *ion transfer member is used to sample* ions [are sampled over a] *with a spatial resolution* defined [area] *by a diameter ranging from 100 micron to 1 centimeter*.

4. The system according to claim 1, wherein [the gas flow generating device is a pump that produces a high flow rate and a low compression ratio] *the ions are transferred over a distance between a lower limit of approximately 1 centimeter and an upper limit of approximately 3 meters*.

8. The system according to claim 1, wherein a distal end of the ion transfer member comprises a plurality of inlets for transferring ions from [multiple locations] *a plurality of positions surrounding the sample* to the inlet of the ion analysis device.

18. A system for analyzing a sample, the system comprising:

an ionizing source for converting molecules of a sample into gas phase ions in a region at about atmospheric pressure;

an ion analysis device; and an ion transfer member *with a lower limit of at least approximately 6.35 millimeter internal diameter, and with an upper limit of approximately 1 decimeter internal diameter* operably coupled to a gas flow generating device, wherein the gas flow generating device produces a gas flow that collects ions into the [gas] *ion* transfer member and transfers the gas phase ions through the ion transfer member to an inlet of the ion analysis device.

19. A method of analyzing a sample, the method comprising:

ionizing a sample to convert molecules of the sample into gas phase ions in a region at about atmospheric pressure;

providing an ion transfer member *with a lower limit of at least approximately 6.35 millimeter internal diameter, and with an upper limit of approximately 1 decimeter internal diameter* coupled to a gas flow generating device to produce a laminar gas flow that transfers the gas phase ions to an inlet of [the] *an* ion analysis device; and analyzing the ions.

*21. The method according to claim 19, where the ion transfer member is flexible.*

*22. The method according to claim 19, where the ion transfer member is used to sample ions with a spatial resolution defined by a diameter ranges from 100 micron to 1 centimeter.*

*23. The method according to claim 19, where a distal end of the ion transfer member comprises a plurality of inlets for transferring ions from a plurality of positions surrounding the sample to a proximal end of the ion transfer member connected to the inlet.*

*24. A device for analyzing a sample comprising:*

*an ionizing source for converting molecules of a sample into gas phase ions in a region at about atmospheric pressure;*

*an ion analysis device with an inlet; and*

*an ion transfer member with a lower limit of at least approximately 6.35 millimeter internal diameter, with an upper limit of approximately 1 decimeter internal diameter, with a spatial resolution defined by a diameter ranging from 100 micron to 1 centimeter, operably coupled to a gas flow generating device, where the gas flow generating device produces a gas flow that transfers the gas phase ions through the ion transfer member to the inlet.*

*25. The device according to claim 24, where the ion transfer member comprises a plurality of inlets for transferring ions from a plurality of positions surrounding the sample through the ion transfer member to the inlet.*

*26. A device for analyzing a sample comprising:*

*an ionizing source for converting molecules of a sample into gas phase ions in a region at about atmospheric pressure;*

*an ion analysis device with an inlet; and*

*a flexible ion transfer member with a lower limit of at least approximately 6.35 millimeter internal diameter, with an upper limit of approximately 1 decimeter internal diameter, with a spatial resolution defined by a diameter ranging from 100 micron to 1 centimeter, where the ions are transferred over a distance between a lower limit of approximately 1 centimeter and an upper limit of approximately 3 meters, where a gas flow generating device produces a gas flow that collects ions into the flexible ion transfer member and transfers the gas phase ions through the flexible ion transfer member to the inlet.*

*27. The device according to claim 26, where the flexible ion transfer member comprises a plurality of inlets for transferring ions from a plurality of positions surrounding the sample through the flexible ion transfer member connected to the inlet.*

*28. A device for analyzing a sample comprising:*

*an ionizing source for converting molecules of a sample into gas phase ions in a region at about atmospheric pressure;*

*an ion analysis device; and*

*an ion transfer member operably coupled to a gas flow generating device, where the ion transfer member comprises a plurality of inlets for transferring ions from a plurality of positions surrounding the sample through the ion transfer member connected to an inlet of the ion analysis device.*

*29. The device according to claim 28, where the ion transfer member is flexible.*

*30. A method of analyzing an analyte comprising the steps of:*

*ionizing the analyte to convert molecules of the analyte into gas phase ions in a region at approximately atmospheric pressure;*

*providing a flexible ion transfer member with a lower limit of at least approximately 6.35 millimeter internal diameter, and an upper limit of approximately 1 decimeter internal diameter, with a spatial resolution defined by a diameter ranging from 100 micron to 1 centimeter coupled to a gas flow generating device that transfers the gas phase ions to an inlet of an ion analysis device; and*

*analyzing the gas phase ions.*

*31. The method according to claim 30, where the flexible ion transfer member comprises a plurality of inlets for simultaneously transferring ions from a plurality of positions surrounding the analyte through the flexible ion transfer member connected to the inlet of the ion analysis device.*

* * * * *